United States Patent [19]
Carr et al.

[11] Patent Number: 5,835,915
[45] Date of Patent: Nov. 10, 1998

[54] REMOTE DUPLICATE DATABASE FACILITY WITH IMPROVED THROUGHPUT AND FAULT TOLERANCE

[75] Inventors: Richard W. Carr, Palo Alto, Calif.;
Brian Garrard, Kent, England;
Malcolm Mosher, Jr., Los Gatos, Calif.

[73] Assignee: Tandem Computer, Cupertino, Calif.

[21] Appl. No.: 761,725

[22] Filed: Dec. 6, 1996

Related U.S. Application Data

[63] Continuation-in-part of Ser. No. 704,111, Aug. 28, 1996, Pat. No. 5,740,433, which is a continuation of Ser. No. 377,152, Jan. 24, 1995, abandoned.

[51] Int. Cl.⁶ ............................................. G06F 17/30
[52] U.S. Cl. .................... 707/202; 707/201; 707/204; 395/182.04; 395/182.13; 395/182.14; 395/182.17; 395/182.18
[58] Field of Search .................................. 707/201, 202, 707/204; 395/182.04, 182.14, 182.13, 182.17, 182.18

[56] References Cited

U.S. PATENT DOCUMENTS

| | | | |
|---|---|---|---|
| 5,043,866 | 8/1991 | Myre, Jr. et al. | 707/202 |
| 5,170,480 | 12/1992 | Mohan et al. | 707/201 |
| 5,276,871 | 1/1994 | Howarth | 707/201 |
| 5,404,508 | 4/1995 | Konrad et al. | 707/202 |
| 5,412,801 | 5/1995 | De Remer et al. | 395/182.18 |
| 5,530,855 | 6/1996 | Satoh et al. | 707/201 |
| 5,561,795 | 10/1996 | Sarkar | 707/202 |
| 5,673,382 | 9/1997 | Cannon et al. | 395/182.04 |
| 5,740,433 | 4/1998 | Carr et al. | 707/202 |
| 5,745,753 | 4/1998 | Moser, Jr. | 1/1 |

OTHER PUBLICATIONS

Guerrero, Jorge, "RDF: An Overview", Tandem Systems Review, Oct. 1991, pp. 34–43.

Sent, Wouter, et al., "RDF Synchronization", Tandem Systems Overview, Summer 1992, pp. 6–23.

*Primary Examiner*—Paul R. Lintz
*Attorney, Agent, or Firm*—Gary S. Williams; Flehr, Hohbach, Test Albritton & Herbert LLP

[57] ABSTRACT

A local computer system has a local database, application programs that modify the local database, and a transaction manager that stores audit records in a local audit trail reflecting those application program modifications to the local database. Each audit record has an associated audit trail position. A remotely located computer system has a backup database. A remote data duplication facility (RDF) is partially located in the local computer system and partially in the remote computer for maintaining virtual synchronization of the backup database with the local database. The RDF includes an extractor process executed by said local computer system, and a receiver process and a plurality of updater processes executed by the remote computer system. The extractor process extracts audit records from the local audit trail and transmits those records to the receiver process. When the receiver process detects that it is receiving audit records not in accordance with a predefined sequence, it transmits an error message to the extractor process. Otherwise it distributes the received audit records to a plurality of image trail files in the remote computer system for processing by updater processes, which initiate redo operations of database modifications denoted in at least a subset of the audit records against the backup database. The extractor process responds to each error message by obtaining a restart audit trail position value from the receiver process and then extracting audit records from the local audit trail starting at that restart audit trail position value.

21 Claims, 21 Drawing Sheets

Updater Status Table 400

| Updater | IT File | Current LimitPosition | Last Reported MIT position | Last Reported IT file position |
|---|---|---|---|---|
| 1 | MIT | | | |
| 2 | MIT | | | |
| 3 | MIT | | | |
| 4 | AIT1 | | | |
| 5 | AIT1 | | | |
| ⋮ | ⋮ | ⋮ | ⋮ | ⋮ |

Transaction Status Table (TST) 144

414 — MIT position for updating TST

| Trans. ID | Status (Commit or Abort) | MIT Position |
|---|---|---|
| S100003 | | |
| S100004 | | |
| S100006 | | |
| ⋮ | ⋮ | |
| S100256 | | |

Receiver Context Record
270-1

| IT | MAT position for last audit record written to IT buffer | File Location for next write to IT disk file | |
|---|---|---|---|
| MIT | 1101 | | Restart MIT position for generating Transaction Status Table — 390 |
| AIT 1 | 1102 | | |
| AIT 2 | 1009 | | Receiver.StopUpdatersCnt |
| AIT 3 | 923 | | — 391 |
| AIT 4 | 1106 | | |

| IT | Buffer Location for next write to IT buffer |
|---|---|
| MIT | |
| AIT 1 | |
| AIT 2 | |
| AIT 3 | |
| AIT 4 | |

FIG. 11B

REMOTE DUPLICATE DATABASE FACILITY WITH IMPROVED THROUGHPUT AND FAULT TOLERANCE

This application is a continuation-in-part of application Ser. No. 08/704,111, filed Aug, 28, 1996, now U.S. Pat. No. 5,740,433 which was a continuation of application Ser. No. 08/377,152, filed Jan. 24, 1995 now abandoned.

The present invention relates generally to database management systems and particularly to a database management system in which a "remote duplicate database facility" monitors changes made to a database on a local system and maintains a copy of that database on a remote system.

BACKGROUND OF THE INVENTION

The purpose of a "remote duplicate database facility" (hereinafter an "RDF") in a database management system (DBMS) is to provide a higher degree of fault tolerance than can be provided through conventional fault tolerance system architectures involving the use of "shadowed" disk storage (i.e., storing all data to two disk storage systems simultaneously) and parallel computers where one computer takes over if the other fails.

In conventional distributed computer systems designed to perform transaction management, one or more transaction managers (i.e.,. management processes) generate and store transaction audit entries in an audit trail. Most audit entries denote a database table record event, such as an addition, deletion or modification of a specified database table record in a specified database table. Commit/abort audit entries indicate that a specified transaction has committed or aborted. Other audit entries may be used to denote yet other types of transactions, such as transactions involving restructuring of the database tables (e.g., adding an additional alternate index to a database table or changing the number of partitions for a database table), while still other audit entries may denote other events not relevant to this document.

A RDF system monitors the information added to the audit trail so as to monitor changes made to a database on a primary system (often called the "local system" or "primary system"), and maintains a backup copy of that database by applying the same changes to a backup database on a remotely located backup system (often called the "remote system" or "remote backup system"). In this manner the backup database on the remote system is kept continuously up to date by the RDF with changes made to the local system.

The remote system is preferably located sufficiently far from the primary system that even a widespread disaster, such as loss of power over a large geographic area, that adversely affects the primary system will not affect the remote system. The use of an RDF system makes it possible to switch business applications from the primary system to the remote backup system in a short period of time, preferably in a matter of minutes. Additionally, if a planned shutdown of the primary system is necessary, business applications can be stopped and immediately restarted on the backup system to access the replicated database.

Prior Art Tandem RDF System

FIGS. 1 and 2 represent the basic architecture of Tandem Computer's RDF system prior to the present invention. The computer system 100 shown in FIG. 1 has a transaction management facility 102 that writes audit entries to a master audit trail (MAT) 104. The audit entries indicate changes made to "audited files" on "RDF protected volumes" 106 of a primary database 108 on a primary system 110. All RDF protected volumes are configured to write all transaction audit records to the MAT 104.

The RDF system 120 includes processes on both the primary (local) computer system 110 and a remote backup computer system 122. The RDF 120 maintains a replicated database 124 (also called the backup database) by monitoring changes made to "audited files" on "RDF protected volumes" 106 on a primary system and applying those changes to corresponding backup volumes 126 on the backup computer system 122. An "audited file" (sometimes called an "RDF audited file") is a file for which RDF protection has been enabled, and an "RDF protected volume" is a logical unit of disk storage for which RDF protection has been enabled. Thus, an RDF protected volume may include both audited and unaudited files.

On the primary computer system 110, an RDF extractor process 130 reads the master audit trail (MAT) 104, which is a log maintained by the transaction management facility (TMF) of all database transactions that affect audited files, and sends any audit records associated with RDF-protected volumes to an RDF receiver process 132 on the backup computer system.

The MAT 104 is stored as a series of files with sequentially numbered file names. The MAT files are all of a fixed size (configurable for each system), such as 64 M bytes. The TMF 102 and Extractor 130 both are programmed to progress automatically (and independently) from one MAT file to the next.

The extractor process 130 appends a timestamp to each audit record that it extracts from the master audit trail 104. The appended timestamp is the timestamp of the last transaction to complete prior to generation of the audit record in the MAT 104. The resulting record is called an audit image record, or image record. The extractor process stores each audit image record in a message buffer 142 having a size of about 28K bytes in the preferred embodiment. The extractor process reads up to 28K bytes of audit records from the MAT 104 at a time, and after each such read operation the resulting message buffer 142 is transmitted to the receiver process 132. The extractor process 130 waits for an acknowledgment message from the receiver process 132 before continuing its processing of audit records in the MAT 104.

The receiver process 132 writes all audit records received from the extractor to a Master Image Trail (MIT) 136 as well as to zero or more auxiliary Image Trails (AITs) 138. The contents of all the image trails 136, 138 are identical. The RDF updater processes 134 on the remote backup system 122 read the audit records from either a master image trail 136 or an auxiliary image trail 138 and apply only audit records associated with committed transactions to the backup database 124. Each RDF-protected volume 106 on the primary computer system 110 has its own updater process 134 on the backup computer system 110 that is responsible for applying audit records to the corresponding backup volume 126 on the backup computer system 110 so as to replicate the audit protected files on that volume. Audit records associated with aborted transactions on the primary system are never applied to the database on the remote backup computer system 122.

The audit image records in each image trail 136, 138 are typically read and processed by two to ten updaters 134. Each updater 134 reads all the audit image records in the corresponding image trail, but utilizes only the audit image records associated with the primary disk volume 106 for which that updater is responsible. Thus, in a system having a large number of RDF protected disk volumes, each updater 134 will utilize only a small fraction of the audit image records in the corresponding image trail 136, 138. For instance, in a system with four image trails (136, 138) and sixteen updaters four per image trail), only about six percent of the audit records read by each updater (on average) will be relevant to that updater.

The receiver process 132 processes the commit/abort records received from the extractor, as they are written to the master image trail 136, by adding the transaction status information in each commit/abort record to a transaction status table (TST) 144, which indicates the status of each transaction that has either committed or aborted.

Since the updaters 134 only initiate redo operations on the audit image records for transactions that have committed, the updaters 134 require the transaction status information in the transaction status table 144. To obtain that information, each updater 134 requests transaction status information from the receiver process 132 whenever it reads an audit image record for a database table that the updater is assigned to replicate and for which the transaction status is unknown to the updater.

The receiver process 132, in response to each status request, sends the requesting updater process 134 a message that includes not only the status of the transaction identified in the status request, but also the status of the next hundred or so transactions in the transaction status table 144 that completed after the identified transaction. If the receiver process 132 does not yet know the status of the identified transaction, it does not respond to the status request until it receives a commit/abort record concerning the identified transaction.

When an updater process 134 reaches the end of file of the image trail 136, 138 to which it is assigned, it performs a wait for a preselected amount of time, such as two to ten seconds before attempting to read more audit image records. Monitor process 140 accepts user commands for controlling the RDF 120. Monitor process 140 also accepts user requests for status information and requests status information from the various processes in the RDF 120 in order to respond to those user requests.

Referring to FIG. 2, the extractor process 130 has a backup extractor process 150 and the receiver process 132 has a backup receiver process 152. The extractor backup process is created by the extractor process 130 and is always resident on a different CPU 160 from the extractor process 130 so as to improve the chances that a hardware failure of the extractor process's CPU will not affect the backup extractor process. Similarly, the receiver backup process 152 is created by the receiver process 132 and is always resident on a different CPU 162 from the receiver process 132.

The extractor backup process 152 is dormant while the primary extractor process 130 remains active. An operating system procedure 156 periodically checks on the primary extractor process 130 to determine if it is still alive. When the operating system determines that the primary extractor process 130 has failed, the extractor backup process 150 takes over execution of the extractor procedures at a takeover location specified by the last checkpoint performed by the primary extractor process 130 (as will be explained in more detail next) utilizing the last checkpointed information 158 from the primary extractor process to establish the backup extractor's process context.

A "checkpoint" operation is defined in this document to mean the storage of information by one process in a backup process. Thus, checkpoints store information in primary memory, not on durable disk or other secondary memory storage. As implemented in Tandem's RDF systems, a checkpoint is a blocking operation. That is, after a checkpoint the primary process performs no useful work until the checkpoint has been acknowledged by the backup process.

The extractor process 130 performs a checkpoint whenever (A) it finishes reading one MAT file and begins reading a next MAT file, (B) whenever the extractor receives acknowledgment from the receiver process 132 that a message buffer has been received, and (C) in a number of special context change circumstances not relevant here. When the extractor process 130 performs a checkpoint, the information 158 transferred by the primary extractor process 130 to its backup process includes:

a takeover location, the extractor's current position in the MAT file; and all data structures associated with processing audit records, including partially processed audit records, the last seen commit/abort timestamp, and so on.

The extractor process 130 does not durably store a context record, except as part of an orderly shutdown of the extractor process. This durably stored context record is used at startup to determine where the extractor process 130 should start reading in the MAT 104.

In the prior art Tandem RDF 120, the transferred takeover location can be any point in the extractor process's programming.

In the prior art Tandem RDF 120, the receiver process 132 frequently performs checkpoint operations. More specifically, the receiver process 132 performs a checkpoint (A) upon receipt of a message buffer of audit information from the extractor process (before sending an acknowledgment reply message to the extractor process), (B) upon completion of a no-waited write to the image trail disk files (i.e., upon receipt of notification of successful writes to all the image trails from the associated disk processes), (C) whenever it fills up one set of image files and begins writing to a next set of image files, and (D) in a number of special context change circumstances not relevant here. Whenever the receiver process 132 performs a checkpoint, the information 164 transferred by the primary receiver process 132 to its backup process 152 includes:

a takeover location, the receiver's current position in the image files (i.e., the current end of file position for each image file, which is also the position for the next write operation to each of the image files); and all data structures associated with processing audit records, including the complete message buffer received from the extractor process, partially processed blocks of data not yet written to image disk files, and an updater status table. The updater status table indicates the last reported image trail read position for each updater.

Immediately after the receiver 132 receives a message buffer of audit image records it performs a checkpoint, moving a copy of its context record and all the received data to its backup process. Then it sends an acknowledgment reply message back to the extractor process 130. Next, it writes a copy of the received audit image records into the master image trail 136 and into each auxiliary image trail 138. The master image trail 136 and each auxiliary image trail 138 are a series of disk files having sequentially assigned file names.

The receiver process 132 durably stores its context record every five seconds so as to durably store its current image trail file positions. This durably stored context record is used at startup to determine where the receiver process 132 should start writing data into the image trail files.

The entire context of the backup extractor process 150 is determined by the checkpoint information stored in its address space by the last checkpoint operation performed by the primary extractor process. When the backup extractor process starts up due to failure of the primary extractor process 130, the backup extractor process 150 does not perform any data structure initializations. Rather, it immediately starts execution at the takeover location provided by the last checkpoint and uses the checkpointed data structures as its own data structures.

In a similar manner, the entire context of the receiver process 152 is determined by the checkpoint information stored in its address space by the last checkpoint operation performed by the primary receiver process 132. When the backup receiver process 152 starts up due to failure of the primary receiver process 132, the backup receiver process 152 does not perform any data structure initializations. Rather, it immediately starts execution at the takeover location provided by the last checkpoint and uses the checkpointed data structures as its own data structures.

This method of primary/backup failover used in the prior art Tandem RDF requires (A) that checkpoints transmit all information needed by the corresponding backup process to resume execution immediately, and (B) that checkpoints be performed not only at all significant context changes, but at all points where failure to perform a checkpoint could result in the extractor and receiver becoming desynchronized.

While the RDF system 120 described above has functioned well in commercial use for years, it has been determined, through long experience, that the failover mechanism has a number of shortcomings, and that operating requirements associated with the failover mechanism have greatly limited the throughput (i.e., the number of database updates handled per second) of the RDF system 120. In particular, a primary shortcoming of the prior art failover mechanism is that there remain circumstances, while rare, in which a backup process will not have the information needed, causing the extractor and receiver to become desynchronized.

Two databases, such as the primary database and backup database are said to be "synchronized" if they both have identical contents, in terms of data configured for replication on the backup database. Two databases are said to be "virtually synchronized" if in the course of its normal operation (i.e., all relevant audit records are being transmitted to the remote backup system) the RDF can make up for any difference between the two databases, as in the case of a time lag between data arriving in the MAT file and being transmitted by the RDF to the backup database. When the RDF catches up to the primary system, the two are once again fully synchronized.

In the prior art RDF system 120, there is no coordination between the extractor and receiver processes 130, 132 other than use of message sequence numbers in the message buffers transmitted from the extractor process 130 to the receiver process 132. The prior art RDF system simply assumes that virtual synchronization of the extractor and receiver processes is maintained at all times. Thus, the system does not provide an automatic system and method for the extractor and receiver to resynchronize in the event that desynchronization occurs. For instance, if receiver receives a message buffer with a wrong sequence number, the RDF system 120 would crash.

While such desynchronizations are rare, the mechanisms used by RDF system 120 to avoid desynchronization are complex, use a large percentage of the RDF's entire resources, and are not entirely failure proof.

In the prior art RDF system 120, the maximum number of image trails 136, 138 that the receiver can handle is seven. This limit is based on the receiver's checkpointing requirements, which absorb much of the receiver process's resources, and the I/O overhead associated with writing all audit information to the image trails.

Another shortcoming of the prior art RDF system 120 that limits the RDF system's throughput, is the requirement that the extractor process 130 wait until a message buffer is acknowledged by the receiver process 132 before the extractor process resumes processing more audit records. The RDF system 120 thus uses only one message buffer at a time. This requirement is based on the need to maintain virtual synchronization between the primary and backup systems. However, this "wait until reply" requirement greatly reduces the overall rate at which the extractor process 130 can process audit records.

Yet another shortcoming of the prior art RDF system 120, alluded to above, is that the updaters 134 (actually the disk processes called by the updaters) are inefficiently used in systems with large numbers of updaters (e.g., more than eight updaters) because only a small fraction of the records in the image trail processed by each updater will be relevant to that updater.

It is therefore a primary object of the present invention to provide an improved RDF failover mechanism that imposes significantly less overhead on the RDF system, while providing complete failover protection against all single process failures and all multiple process failures. It is thus an object of the present invention to ensure the integrity of the RDF for any type of failure.

A related object of the present invention is to provide an RDF system with tight synchronization between the extractor and receiver processes and procedures that guarantee, regardless of the cause or type of failure, that the two will resynchronize automatically.

Another related object of the present invention is to provide a primary process to backup process failover mechanism for the extractor and receiver processes that does not rely on frequent checkpointing, thereby avoiding the high overhead associated with such checkpointing and the inherent complexity of such checkpointing.

Another object of the present invention is to make the process of sending audit records from the extractor process to the receiver process more efficient.

Yet another object of the present invention is to make the receiver and updater processes more efficient by delivering to each image trail only the audit records needed by the updater processes utilizing those image trails.

SUMMARY OF THE INVENTION

In summary, the present invention is a distributed computer database system having a local computer system and a remote computer system. The local computer system has a local database stored on local memory media, application programs that modify the local database, and a transaction manager that stores audit records in a local audit trail reflecting those application program modifications to the local database as well as commit/abort records indicating which of the transactions making those database modifications committed and which aborted. Each audit record has an associated audit trail position in the local audit trail, otherwise referred to as a MAT (master audit trail) position.

The remote computer system, remotely located from the local computer system, has a backup database stored on remote memory media associated with the remote computer system.

A remote data duplication facility (RDF) is partially located in the local computer system and partially in the remote computer for maintaining virtual synchronization of the backup database with the local database. The RDF includes an extractor process executed by said local computer system, and a receiver process and one or more updater processes executed by the remote computer system.

The extractor process extracts audit records from the local audit trail. It has a plurality of message buffers (four in the preferred embodiment) for buffering groups of the extracted audit records together and transmits each message buffer to said remote computer system when the buffer is full or a timeout occurs. Each transmitted message buffer has an associated sequence number. The sequence numbers for sequentially transmitted message buffers follow a predefined sequence. The extractor process continues, after transmitting any message buffer to the remote computer system, to buffer groups of extracted audit records in other ones of the message buffers and to transmit those message buffers to the remote computer system.

The receiver process stores an expected next message sequence number and a context record denoting a restart audit trail position value. The receiver process receives message buffers transmitted by the extractor process. It compares the message sequence number associated with each received message buffer with its locally stored expected next sequence number. If the two do not match, the receiver process transmits an error message to the extractor process. If the two do match, the receiver process responds by sending a reply message to the extractor process acknowledging receipt of the message buffer, updating the expected next message sequence number in accordance with the predefined sequence. It then distributes the audit records in the received message buffer to one or more image trails in the remote computer system and updates the restart audit trail position value based on the audit trail positions associated with said audit records in said received message buffer.

Each updater process, executed by the remote computer system, reads the audit records in an assigned image trail and initiates redo operations of database modifications denoted in at least a subset of the read audit records against the backup database.

The extractor process responds to each reply message acknowledging receipt of a message buffer by enabling reuse of that message buffer, and also responds to each error message by determining the restart audit trail position value stored by the receiver process and then extracting audit records from the local audit trail starting at that restart audit trail position value.

The receiver process distributes the audit records from the received message buffers to one or more image trails. A subset of the audit records are update audit records indicating database modifications associated with a particular transaction. Another subset of the audit records are commit/abort records indicating a status (e.g., abort or commit) of the transaction associated with one or more of the update audit records. Status audit records are stored in a master image trail, while update audit records are preferably stored in one or more auxiliary image trails. However, some or all of the update audit records can be stored in the master image trail.

Associated with each image trail is a buffer (which is actually organized as a set of two alternately used buffers). The receiver process distributes the audit records from each received message buffer into one of the appropriate image trail buffers. The buffers are periodically flushed, storing the audit records in the associated image trails (i.e., durably stored files). Each updater process reads the update audit records from an assigned image trail and applies the specified modifications to its assigned portion of the backup database.

Before an updater process modifies the backup database as specified in a update audit record, it requests from the receiver process the status of the transaction associated with the audit record. Typically, the status of a transaction can be commit, indicating that the updater process is to perform the modification, or abort, indicating that the updater process is to abandon the modification. The receiver process retrieves the status from a copy of the commit/abort status audit record that is stored in a transaction status table. In addition, each updater process only processes records in its specified image trail up to a LimitPosition location in that image trail. The LimitPosition for each image trail is periodically updated by the receiver process so as to ensure that each updater only performs redo operations for transactions whose components are all durably stored in the various image trails.

BRIEF DESCRIPTION OF THE DRAWINGS

Additional objects and features of the invention will be more readily apparent from the following detailed description and appended claims when taken in conjunction with the drawings, in which:

FIGS. 7B–7D are block diagrams of data structures used by the receiver process in a preferred embodiment of the present invention.

FIGS. 11A–B depict data structures and FIG. 11C is a flow chart of a context save procedure used in an alternate embodiment.

DESCRIPTION OF THE PREFERRED EMBODIMENTS

Figure 3:
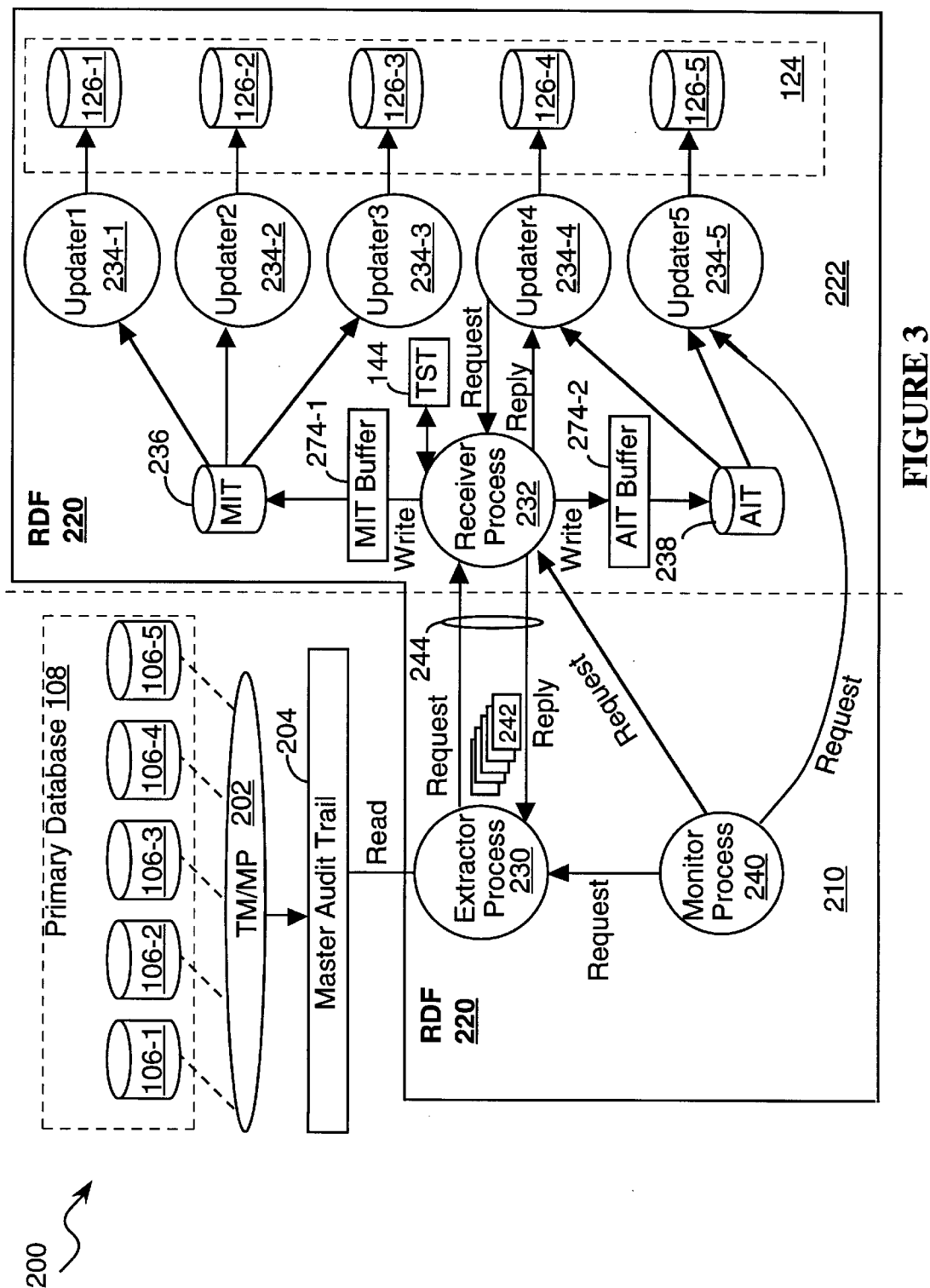
FIG. 3 is a block diagram of a database management system with a remote duplicate database facility in accordance with the present invention.
Figure 4:
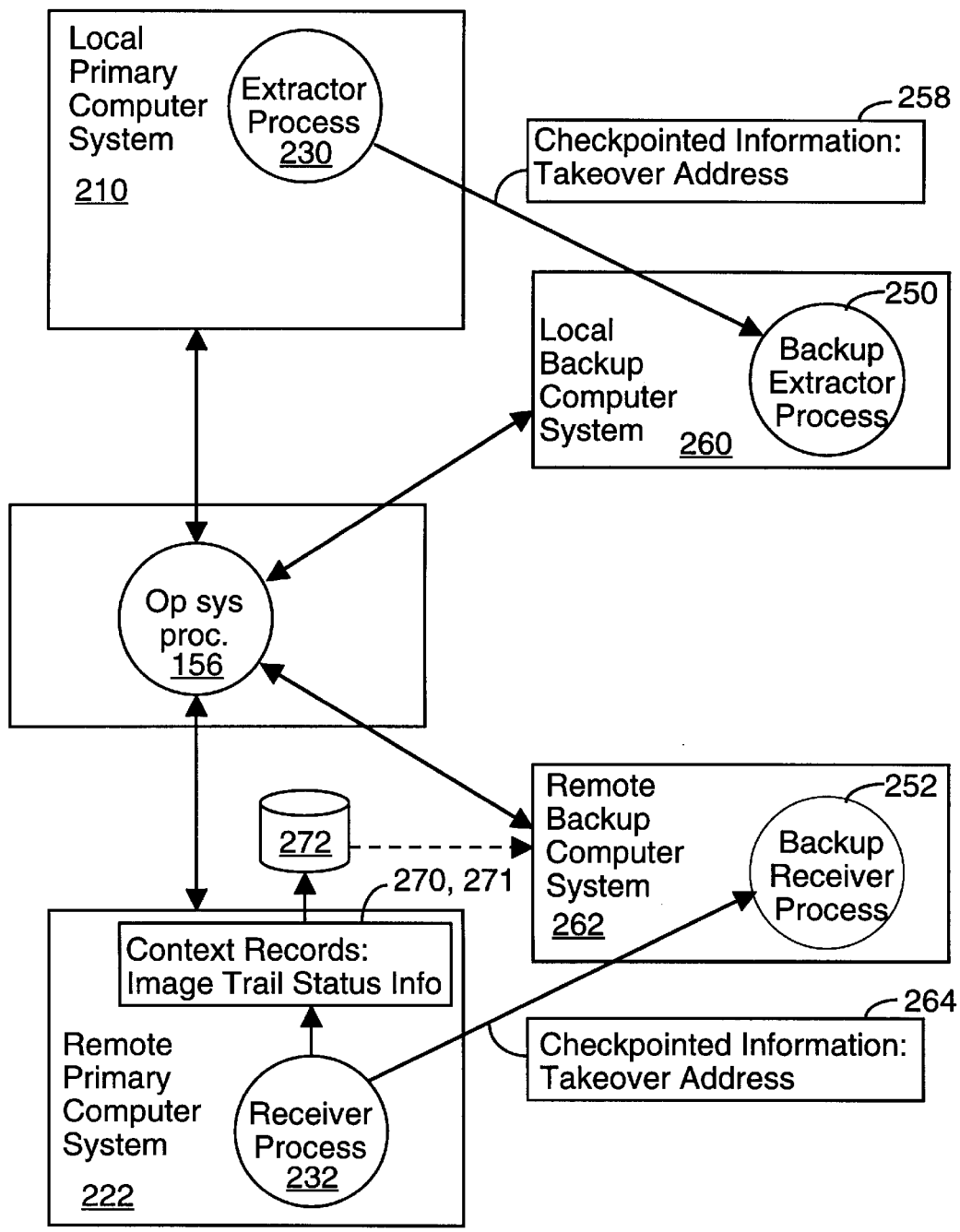
FIG. 4 is a conceptual representation of the checkpoint, context save, and failover procedures used by the system shown in FIG. 3.

FIGS. 3 and 4 represent the basic architecture of a computer system 200 utilizing the remote duplicate database facility (RDF) 220 of the present invention. Operation of the present invention will be explained by first giving an overview of how the present invention differs from the prior art Tandem RDF system discussed in the background section of this document. The overview is then followed by a detailed explanation of the extractor, receiver and updater processes of the present invention, and their failover procedures.

Overview of Improved RDF System

Figure 1:
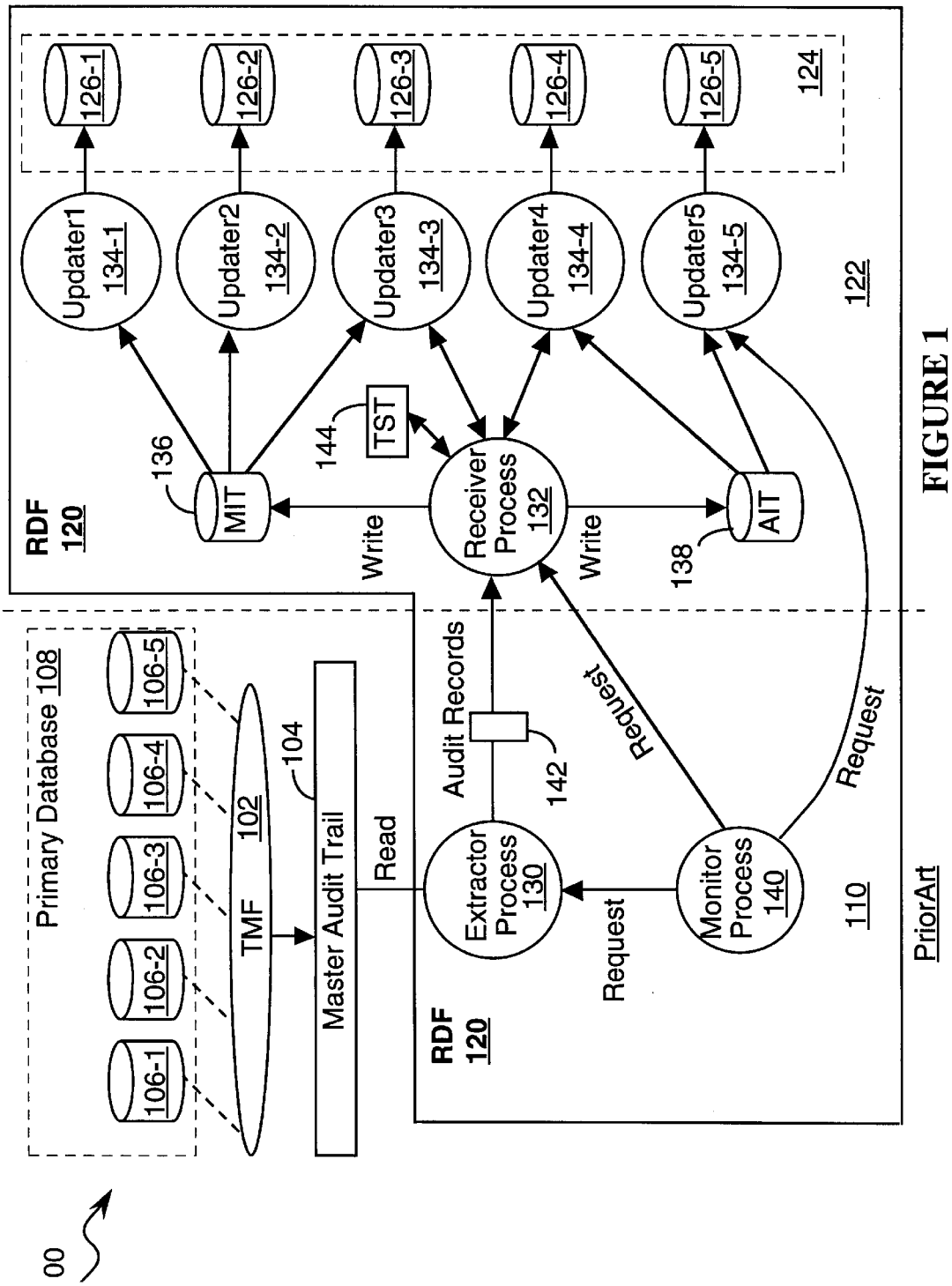
FIG. 1 is a block diagram of a prior art database management system with a remote duplicate database facility.
Figure 2:
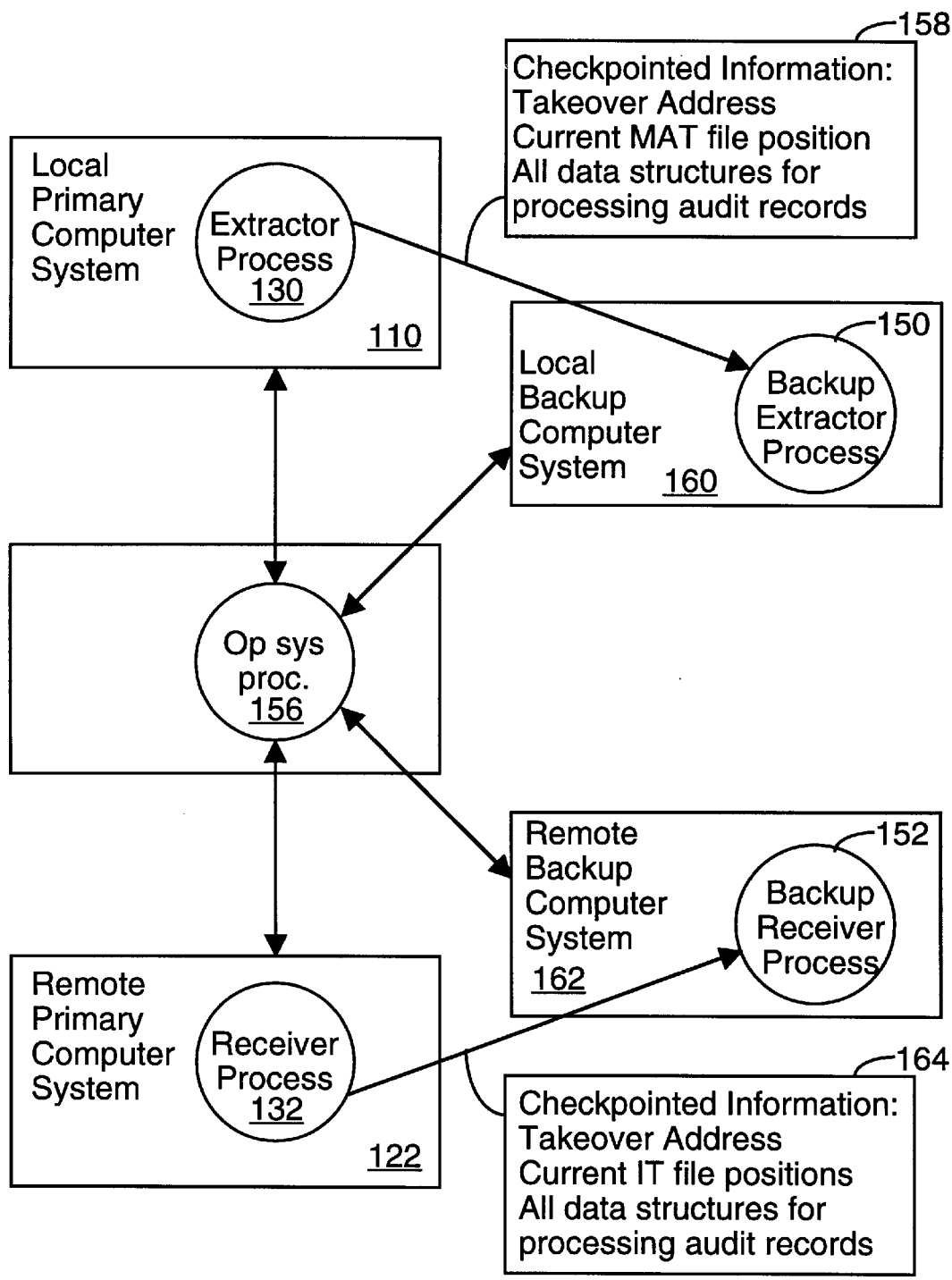
FIG. 2 is a conceptual representation of the checkpoint and failover procedures used by the system shown in FIG. 1.

The extractor-receiver-updater architecture of the RDF system 220 (shown in FIG. 3) has many similarities to the RDF system 120 of FIGS. 1 and 2. Furthermore, the operation of the transaction management/massively parallel system (TM/MP) 202 is similar to that of the TMF 102, although most of the changes are not directly relevant to the present invention, with the exception of a new type of audit record stored in the MAT 204 when an "online DDL" operation is performed.

The extractor process 230 of the present invention differs from the prior art version as follows. First, the extractor process 230 of the present invention does not perform frequent checkpoint operations. In fact, the extractor process performs only a single checkpoint operation during startup of the extractor process, and that checkpoint 258 only sends a takeover location to the backup extractor process 250. (See FIG. 4.) After that, the extractor process 230 performs no further checkpoints. It also does not durably store a context record. Rather, the extractor process 230 has been revised so that the extractor relies on information received from the receiver process 232 when recovering from a failover, as will be explained in more detail below, as well as during an RDF startup.

The second most significant change to the extractor process is that it now uses a plurality of message buffers 242. The extractor process 230 now uses two to eight message buffers 242, with four message buffers being a typical configuration. After filling and transmitting a message buffer 242 to the receiver process via a communication channel 244, the extractor process 230 does not wait for an acknowledgment reply message from the receiver process 232. Rather, as long another message buffer is available, it continues processing audit records in the MAT 204, storing audit image records in the next available message buffer 242. Each message buffer 242 is made unavailable after it is transmitted to the receiver process 232 until a corresponding acknowledgment reply message is received from the receiver process 232, at which point the message buffer 242 becomes available for use by the extractor process 230.

These two changes (i.e., almost complete elimination of checkpointing and use of multiple message buffers) to the extractor process 230 greatly increase its efficiency, the first by almost eliminating resource usage for failover protection, and the second by allowing the extractor process 230 to continue processing audit records in the MAT 204 while waiting for the receiver process to acknowledge receipt of previously sent audit records.

The receiver process 232 of the present invention differs from the prior art version as follows. First, the receiver process 232 of the present invention does not perform frequent checkpoint operations. In fact, the receiver process performs only a single checkpoint operation during startup of the receiver process, and that checkpoint 264 only sends a takeover location to the backup receiver process 252. (See FIG. 4.) After that, the receiver process 232 performs no further checkpoints. However, it does periodically (e.g., once every 5 to 25 seconds) durably store a receiver context record 270 and a set of Image Trail context records 271 on a nonvolatile (disk) storage device 272. The context records 270, 271 stored by the receiver process 232 are quite small, consisting primarily of a few values for each image trail.

Compared with the checkpointing performed by the above described prior art receiver process 232, which was typically performed multiple times per second during normal usage and involved the storage of large quantities of information (up to 30K bytes of data), the periodic context record save operations by the receiver process 232 in the present invention use significantly less resources.

The second significant change to the receiver process is that the receiver process immediately acknowledges each received message buffer. No processing of the message buffer is performed before the acknowledgment is sent. The elimination of message buffer checkpointing by the receiver, and the use of multiple message buffers by the extractor, makes both the receiver and extractor more efficient because idle time in both processes is greatly reduced. Throughput of records from extractor to receiver has improved by approximately a factor of ten (from approximately 110K bytes/sec to approximately 1300K bytes/sec on hardware configurations in use in 1996).

A third significant change to the receiver process is that it now sorts received audit records such that (A) commit/abort records are stored only in the master image trail 236, and (B) each database update audit record is moved into only the one image trail 236, 238 corresponding to the only updater process 234 that will potentially use that audit record to update data stored on a backup volume 126. Furthermore, there is no limit on the number of image trails used, while there was a limit of seven image trails in the prior art RDF system due to checkpointing limitations. These changes significantly reduce the I/O burden on the receiver process 232. In a system with N image trails 236, 238, the number of audit records written to disk files is reduced by a factor of N in comparison with the prior art receiver process. This change also makes the updater processes 234 much more efficient than the prior art updater processes 134 because the number of audit records read (by their corresponding disk processes) is also reduced on average by a factor of N.

A fourth significant change to the receiver process is that the receiver process now includes a separate "double buffer" for each image trail. In the preferred embodiment, each image trail has two 56K byte buffers that are used in alternating fashion. Each image trail buffer 274 is structured as thirteen blocks of length 4K bytes, plus an overflow area and each image trail buffer is considered to be full when the first 52K bytes of the buffer have been filled with audit records.

A fifth change to the receiver process is that whenever it receives a special "Stop Updaters" audit record, it copies that record into all the image trails. The Stop Updaters audit record, produced on the primary system 210 by special "online DDL" procedures, causes all the Updaters 234 to stop and prompts the operator of the RDF to (A) perform the same DDL procedure on the remote backup system as was performed by the online DDL procedure and then (B) to re-start the updaters. This last change to the receiver process affects neither the failover effectiveness of the RDF system nor the computational efficiency of the receiver process 232. Rather, it is a procedure used to ensure continued virtual synchronization of the local and remote database when "online DDL" procedures are used to restructure database objects with minimal interruption of user access to the database objects being restructured.

Unlike the prior art RDF system, which had virtually no synchronization of extractor and receiver precesses, the present invention provides tight synchronization of the extractor and receiver processes and provides for automatic resynchronization whenever either process is started or has a failover, and whenever the receiver process receives audit records out of order from the extractor process.

A change to the updater processes is that they now read a master image trail position value embedded periodically in "header" records in their respective image trail files. Whenever the updater process sends a request to the receiver process, it reports to the receiver process the saved MIT position and the saved image trail file position in the updater's last durably stored context record.

The first reported value is used by the receiver process 232 to determine where in the master image trail 236 to start when reconstructing the transaction status table 144, and also to determine which portions of the transaction status table 144 are no longer needed and thus can be discarded. The reported MIT position is also used to determine which MIT files can be discarded. The second reported value is used by the receiver process 232 to determine which image trail files have been processed by all the updaters assigned thereto and thus can be deleted (as was also the case in the prior art RDF system 120).

Detailed Explanation of Extractor Process

Figure 5A:
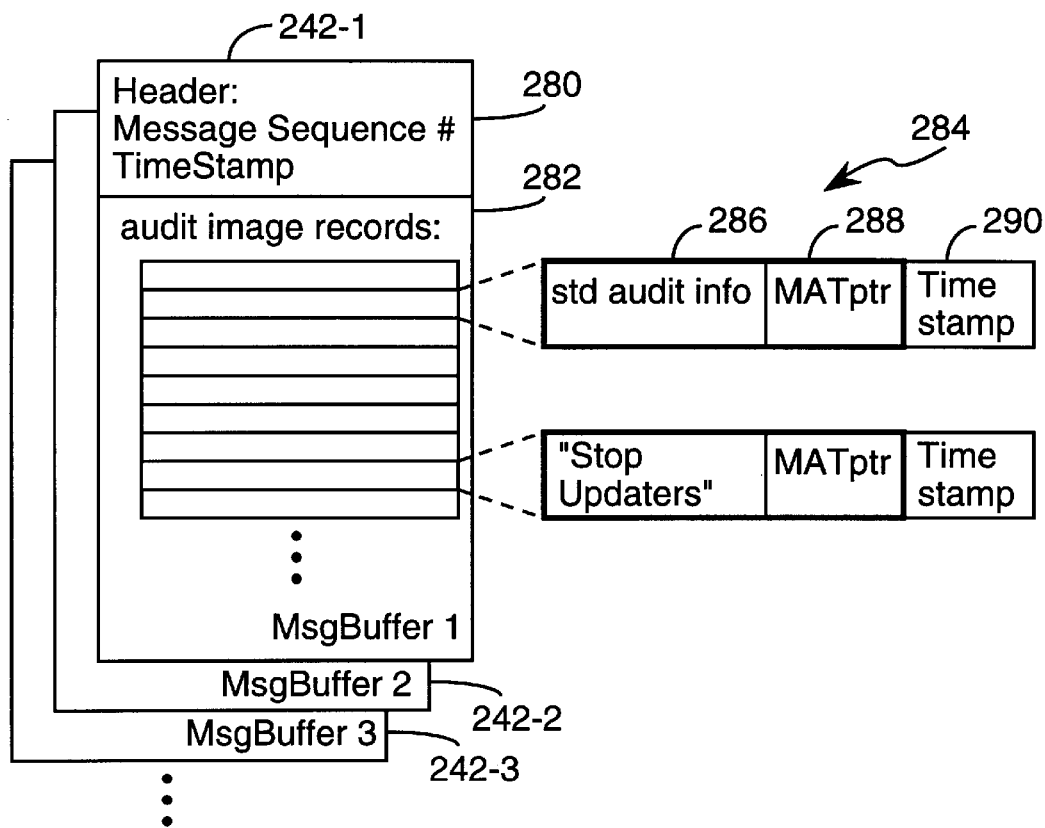
FIGS. 5A and 5B depict data structures used by the extractor process in a preferred embodiment of the present invention.
Figure 5B:
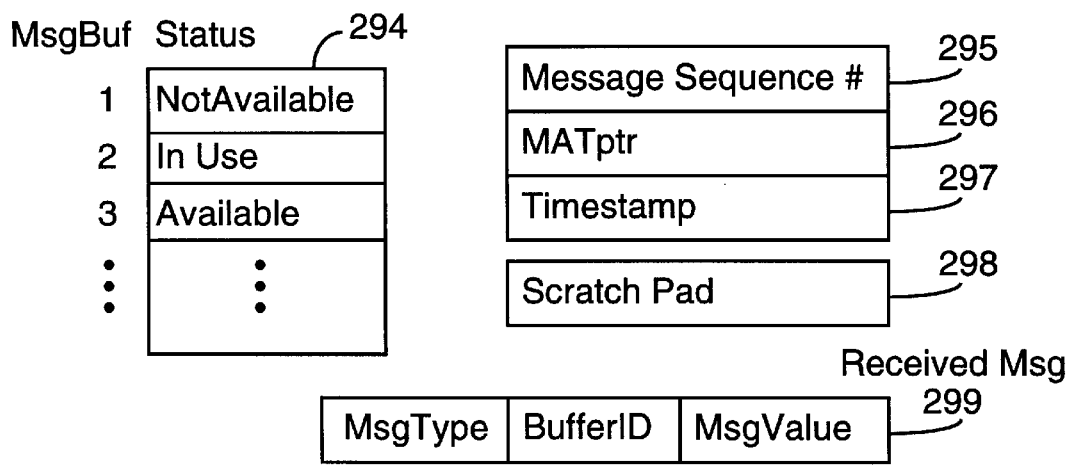

Referring to FIGS. 5A and 5B, the primary data structures used by the extractor process 230 are as follows. As stated earlier, the extractor process 230 utilizes two or more message buffers 242. A portion of each message buffer 242 is used to store a "header" 280, which includes (A) a message sequence number and (B) a timestamp. The body 282 of the message buffer 242 is used to store audit image records 284. Each image record 284 includes an audit information portion 286, a MAT position value 288 and a timestamp value 290. The audit information portion 286 and the field occupied by the MAT value 288 are copied from an audit record in the MAT 204, while the timestamp field 290 is appended by the extractor process to create an "audit image record" 284.

The audit information portion 286 consists of the standard information found in audit records in the MAT 204, such as before and after field values for a modified row in a database table, or a commit/abort indication for a completed transaction. In accordance with the present invention, a new audit image record is defined in which the audit information portion 286 contains a "Stop Updaters" value, indicating that each updater process 234 should be stopped when it reads that audit record.

The extractor process 230 also maintains a message buffer status table 294, which indicates for each message buffer whether that buffer is available for use, not available for use, or is currently in use by the extractor. In addition, the extractor process 230 maintains a message sequence number in register 295, a MAT file pointer in register 296, a local timestamp value in register 297, and a scratch pad 298 in which it stores audit image records that it is currently processing.

Finally, the extractor process 230 includes a data structure 299 for storing reply messages received from the receiver process 232. This data structure includes a first field indicating the type of message received, which is equal to either "message buffer acknowledgment" or "resynch reply", a message buffer identifier, and a "message value" field. The message value field is equal to a MAT position value when the message type is "resynch reply," and is equal to either an "OK" or "Error" condition code when the message type is "message buffer acknowledgment."

Appendix 1 lists a pseudocode representation of the procedures executed by the extractor process 230. Appendix 2 lists a pseudocode representation of the procedures executed by the receiver process 232. Appendix 3 lists a pseudocode representation of the procedures executed by the updater processes 234. The pseudocode used in Appendices 1–3 is, essentially, a computer language using universal computer language conventions. While he pseudocode employed here has been invented solely for the purposes of his description, it is designed to be easily understandable by any computer programmer skilled in the art.

Referring to FIGS. 6A–6E, and the pseudocode in Appendix 1, the extractor process 230 works as follows.

The Extractor Startup Procedure 300 is called whenever the extractor process 230 or its backup starts up, as in the case of a failover or a transfer of control back to the primary extractor process 230 from the backup extractor process. The Startup procedure begins by creating a backup process (302). The startup procedure then performs a "static initialization" of the extractor process (304), which means that all static data structures used by the extractor process are allocated and initialized. While initializing static data structures, the extractor process reads information denoting the set of RDF protected objects from a disk file having a predefined filename and disk location, and builds an internal table of RDF protected disk volumes. This table is used later as a audit record filter, such that object update audit records for non-RDF protected volumes are ignored by the extractor process. Then a checkpoint operation is performed in which a takeover location is transmitted to the backup extractor process (306). The takeover location is, in essence a program address, and in the preferred embodiment the takeover location is the program location at which execution of the volatile initialization procedure 310 begins. Finally, the Extractor Startup procedure calls (308) the Extractor Volatile Initialization procedure 310.

The Extractor Volatile Initialization procedure 310 is called during startup by the Extractor Startup procedure 300 and when the extractor receives an Error reply message in response to a message buffer. The Extractor Volatile Initialization procedure begins by allocating and initializing all volatile data structures used by the Extractor process, including message buffers 242, the message buffer status array 295 (312), and the message sequence number (which gets initialized to an initial value such as 1). Then the Extractor Volatile Initialization procedure transmits a Resynchronization Request message to the receiver process (314) and waits for a Resynch Reply message (316). The Resynch Reply message will contain a MAT position value, which the Extractor Volatile Initialization procedure moves (318) into the MAT position pointer MATptr 296. Finally, the Extractor Volatile Initialization procedure calls (320) the main Extractor procedure 330.

The Main Extractor procedure 330 begins by initializing and starting a timer called the Message Timer (MsgTimer) (332). The Message Timer is typically programmed to expire in 1 or 2 seconds, although the timeout period is configurable to virtually any value. Next, the extractor procedure reads a record in the MAT (334). If the MAT record is an audit record for an RDF protected object, is a commit/abort record for any transaction, or is a "Stop Updaters" record, the audit record is modified by inserting the MAT position of the current audit record into the audit record and by appending to the audit record a timestamp (336). The appended timestamp is the timestamp of the last transaction to complete prior to generation of the audit record in the MAT 204. Every time the extractor procedure encounters a commit or abort audit record, it moves a copy of the timestamp in that record into its local timestamp register 297. The value in the local timestamp register 297 is the timestamp that is appended to audit records so as to generate an audit image record, also known as an image record.

If the message buffer currently in use has room for the resulting audit image record (338) it is moved into the message buffer (340). Then the Extractor procedure continues processing the next record in the MAT at step 334.

If the message buffer currently in use is full (338), the values stored in the message sequence number register 295 and the timestamp register 297 are inserted into the Message Buffer's header 280 (342). The extractor procedure then transmits the message buffer to the receiver process (344). After transmitting the message buffer, the Message Buffer Status array 294 is updated to indicate that the message buffer just transmitted is not available for use. In addition, the Message Timer is cleared and restarted, and the Message Sequence Number in register 295 is increased by one (346). Finally, the audit image record that did not fit in the last message buffer is moved into a next message buffer (348). If a next message buffer is not available, the extractor procedure waits until one becomes available and then moves the audit image record into it. Then the Extractor procedure continues processing the next record in the MAT at step 334.

When the audit record read (334) from the MAT 204 is not an audit record for an RDF protected table, is not a transaction commit/abort record and is not a "Stop Updaters" record, the audit record is ignored and the next audit record (if any) in the MAT is read (334).

Figure 6A:
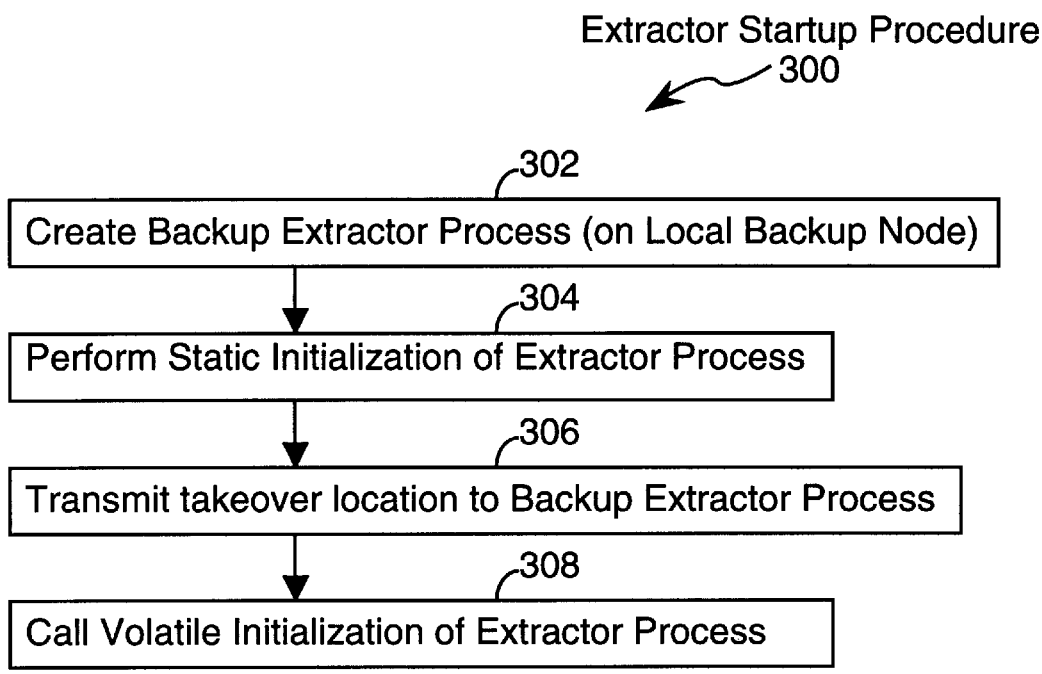
FIGS. 6A–6E are flowcharts of procedures executed by the extractor process in a preferred embodiment of the present invention.
Figure 6B:
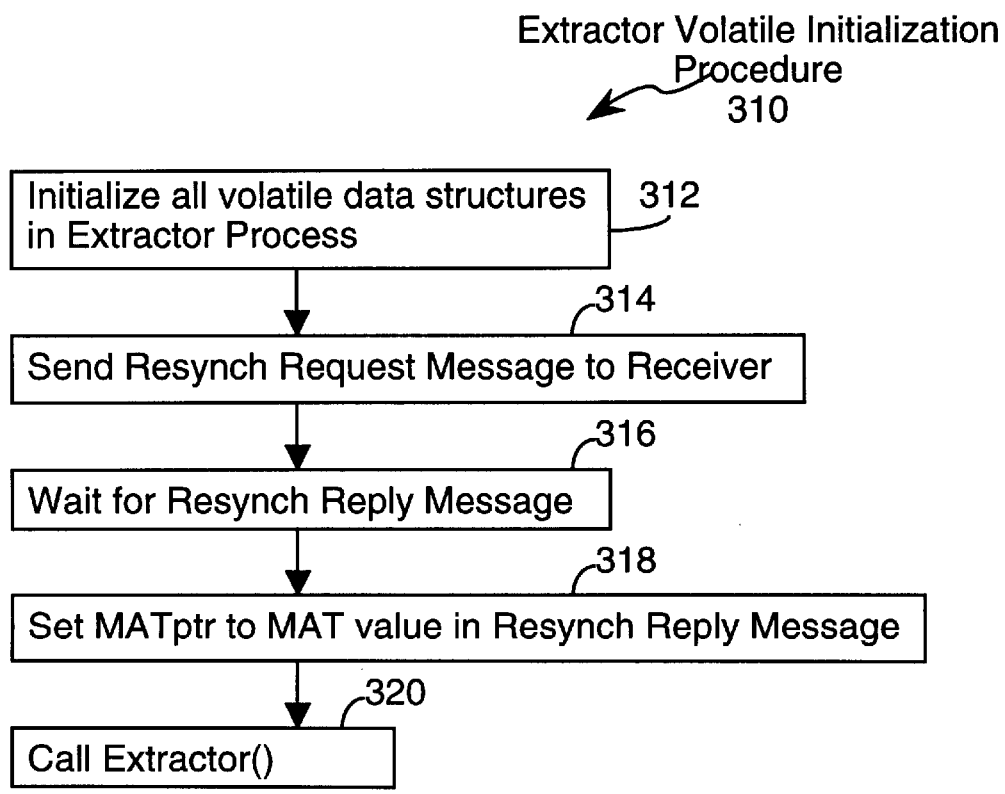
Figure 6C:
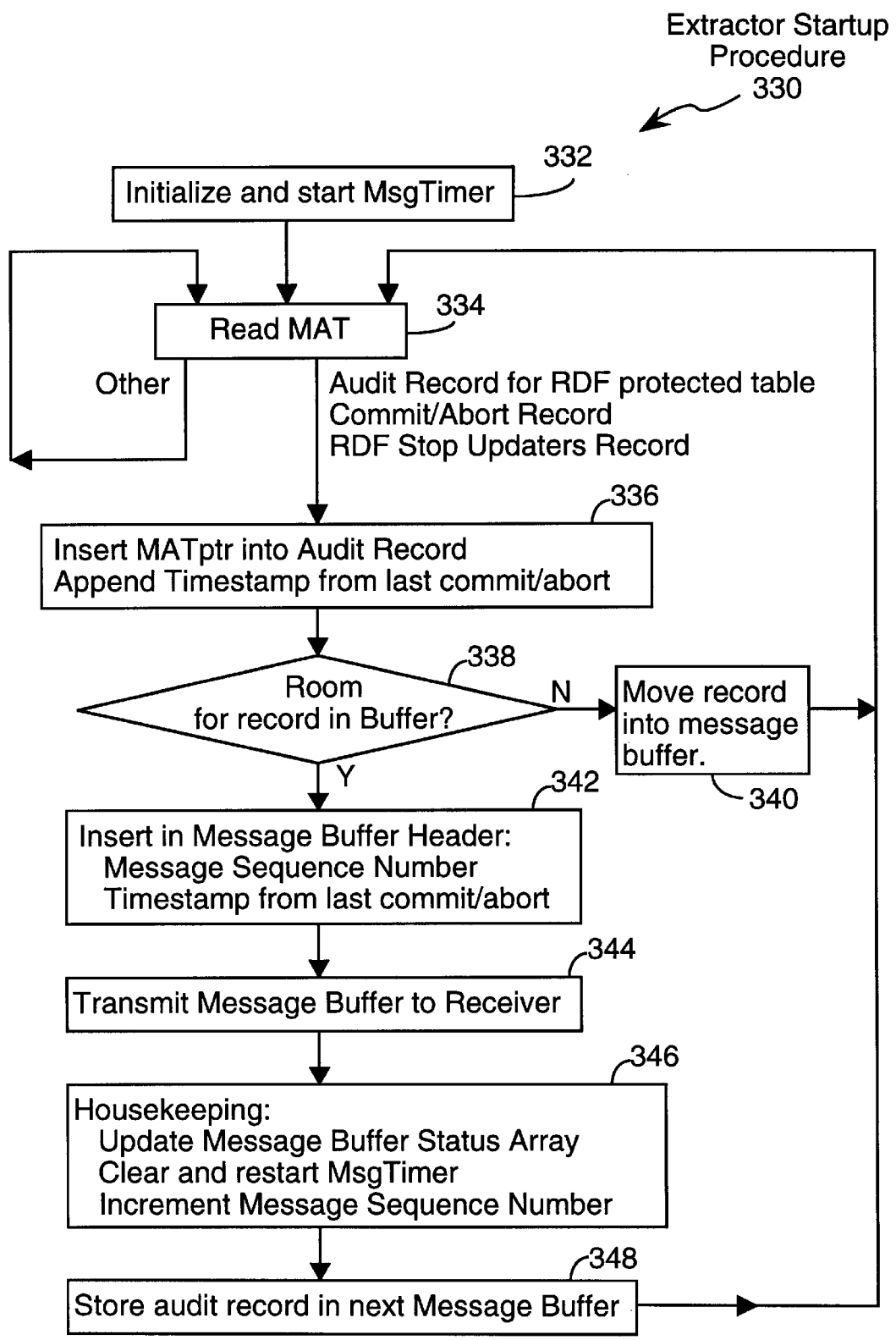
Figure 6D:
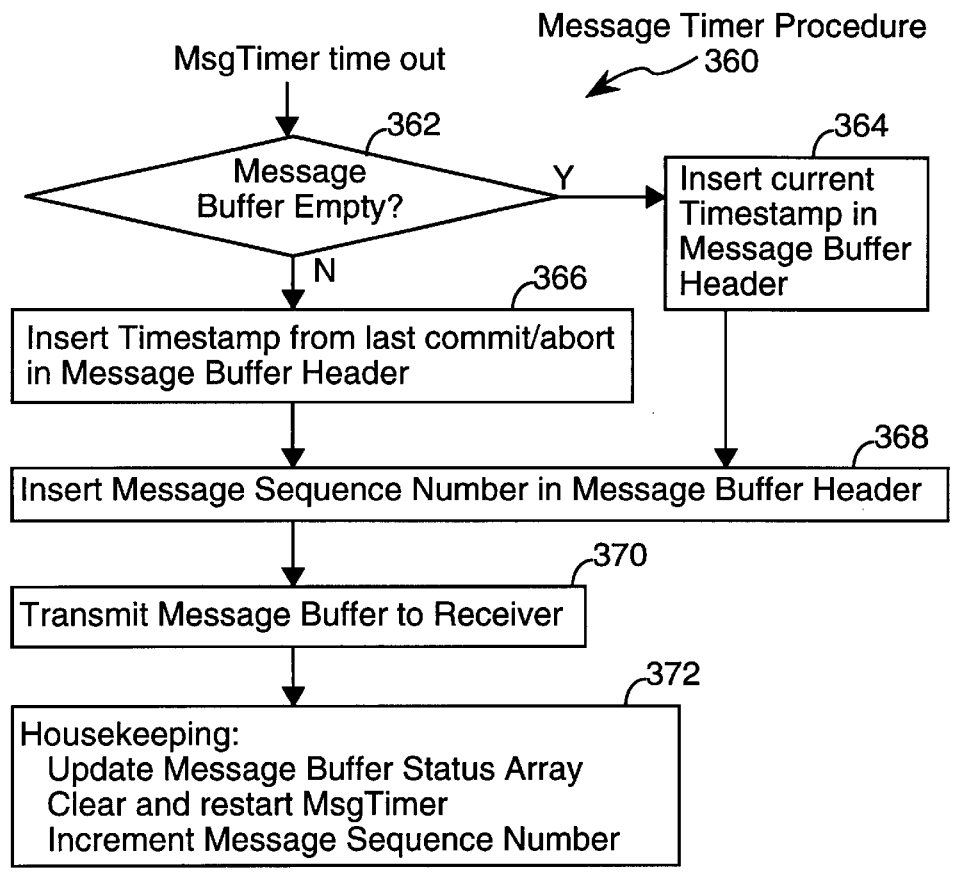
Figure 6E:
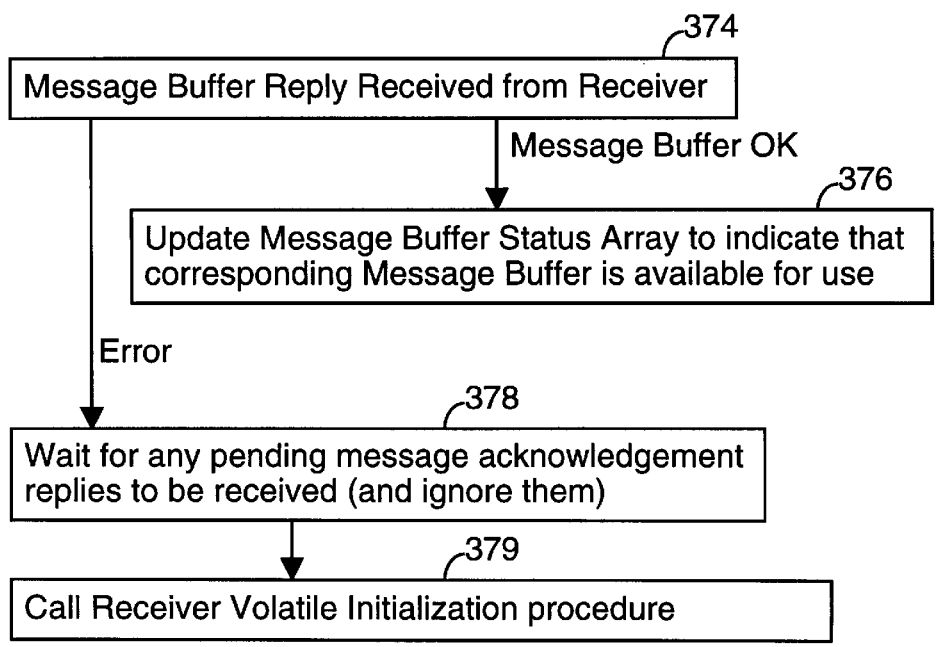

The purpose of the Message Timer is to ensure that audit image records are transmitted to the receiver process in a timely fashion, even when the rate at which audit records are generated for RDF protected files is low. Referring to FIG. 6D, when the Message Timer times out the Message Timer procedure 360 first checks to see if the current Message Buffer is empty (i.e., contains no audit image records) (362). If so, a current timestamp indicative of the current time is inserted into the Message Buffer header 280 (364). If not, the timestamp value from the last commit/abort record, stored in timestamp register 297, is inserted into the Message Buffer header (366). Then the current Message Sequence Number is inserted in the Message Buffer header (368) and the Message Buffer is transmitted to the receiver (370). After transmitting the message buffer, the Message Buffer Status Array 294 is updated to indicate that the message buffer just transmitted in not available for use, the Message Timer is cleared and restarted, and the Message Sequence Number in register 295 is increased by one (372).

When the extractor process receives a reply from the receiver process acknowledging receipt of a message buffer (374), if the reply message indicates the message buffer was received without error, the Message Buffer Status Array 294 is updated to indicate that the message buffer identified in the reply message in available for use (376).

If the reply message received by the extractor process from the receiver process has a message value indicating an error condition, the receiver process is requesting that the extractor and receiver resynchronize. The receiver process sends an error condition reply message whenever (A) a message with an out-of-sequence Message Sequence Number is received, and (B) whenever the receiver process starts up after a failover or return of control back to the primary receiver process from the backup receiver process (sometimes called a CheckSwitch). When the extractor process receives an error condition reply message from the receiver process, it waits for any pending message acknowledgment replies to be received for any other message buffers transmitted prior to receipt of the error condition reply message, and it ignores those reply messages (378). Then the extractor process calls the Extractor Volatile Initialization procedure (379) so as to resynchronize the extractor process with the receiver process.

Detailed Description of Receiver Process

Figure 7A:
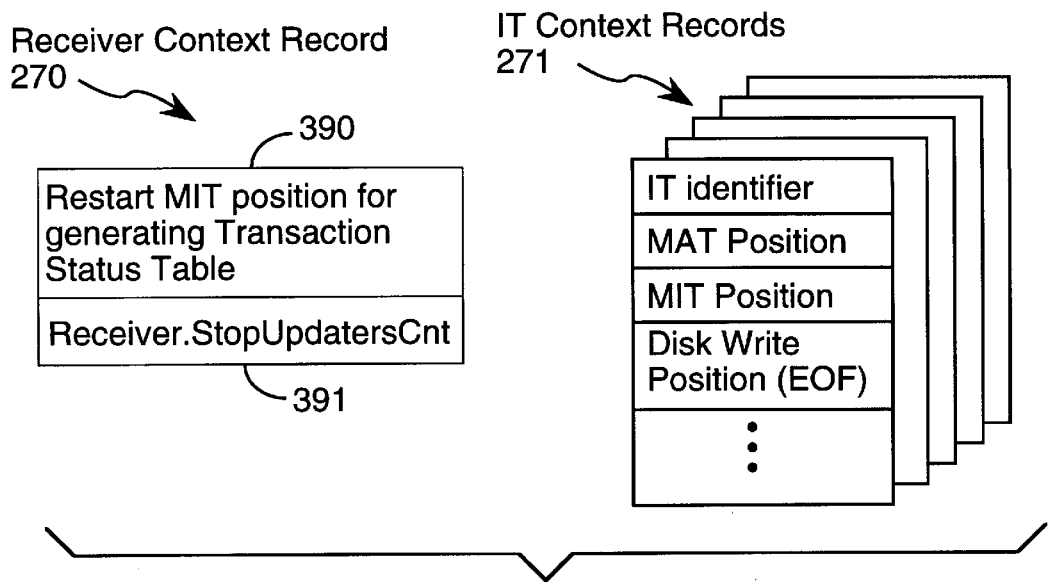
FIG. 7A is a block diagram of a receiver context record and a set of image trail context records for the receiver process in a preferred embodiment of the present invention.
Figure 7B:
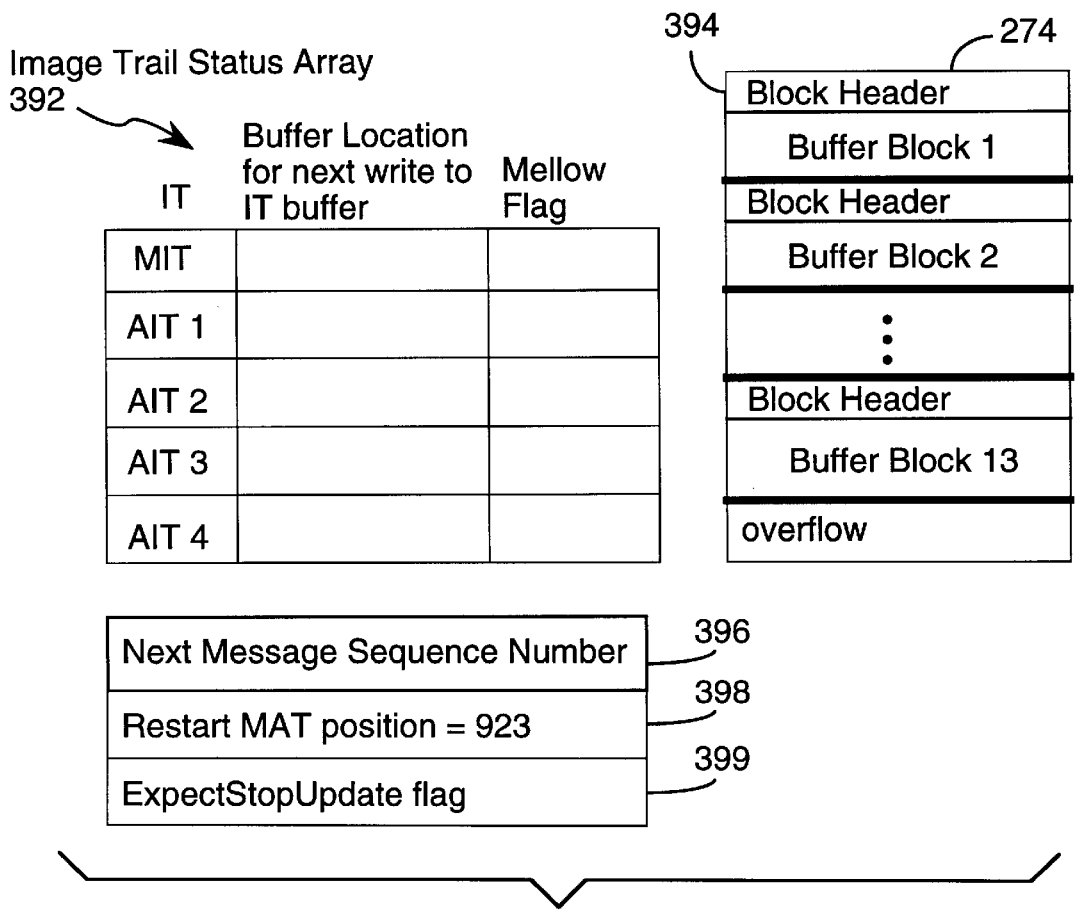

The primary data structures used by the receiver process 232 in the preferred embodiment are shown in FIGS. 7A–7D. As stated earlier, the receiver process durably stores a receiver context record 270 and a set of Image Trail context records 271 on a nonvolatile (disk) storage device 272 on a periodic basis. As shown in FIG. 7A the receiver context record 270 includes a TST/MIT restart position 390, and a Receiver.StopUpdatersCnt count value 391. Each image trail's context record 271 includes a MAT position, MIT position and an end of file (EOF) position indicator. In some circumstances, the receiver context record 270 and a set of Image Trail context records 271 may be collectively called the receiver context record or receiver context records, since these context records are collectively used to enable the receiver process to restart itself and to resynchronize with the extractor process.

Each image trail buffer 274 consists of thirteen blocks of data, where the size of each block spans 4K bytes, plus a 4K byte overflow storage area. Each block contains a block header 394 containing a Master image trail (MIT) position indicator, indicating the MIT position of the last commit/abort record written to the MIT before any audit records were stored in the image trail block. As stated earlier, two image trail buffers 274 are used for each image trail, and these are used in alternating fashion.

As explained earlier, every audit record shipped to the receiver process 232 has a MAT position value inserted in it by the extractor process. The MAT position in an image trail context record 271 indicates the MAT position of the last audit record durably stored in the image trail file.

The MIT position in an image trail context record 271 indicates a MIT position associated with the last durably stored image trail buffer. This is the MIT position in the last 4k block header of the last image trail buffer stored before the image trail context record 271 was last stored.

Furthermore, each image trail buffer 274 is written to the corresponding disk file only (A) when the image trail buffer 274 is full (i.e., contains 52K of data) or (B) when the receiver process performs a periodic flush operation. Each time data from any image trail buffer 274 is written to disk, the disk file location for the next write to the image trail file (i.e., the disk address for the current end of the image trail file) is stored in the appropriate field of the image trail context record 270. However, as will be described below, the image trail context record is durably stored no more than once per M second receiver process epoch, where M is the number of seconds between executions of the receiver context save procedure.

The restart MIT position 390 in the receiver context record is derived from the updater status table 400, as will be described below. Basically, the restart MIT position is a position in the Master Image Trail at which the receiver process 232 should start processing audit records for rebuilding the transaction status table 144.

The Receiver.StopUpdatersCnt 391 is a count value that is incremented each time the receiver encounters a StopUpdaters record in a received message buffer whose MAT value is higher than the MAT position for at least one image trail.

The image trail status array 392 stores one pointer value for each image trail, and also stores a Mellow flag. The stored pointer value is the buffer location for the next audit record to be written to the image trail buffer 274, and is updated every time an audit record is written to the image trail buffer to point to the next available position for an audit record in that buffer. Whenever the buffer pointer value reaches a 4K byte boundary, certain information (described below) is written into the next block header 394 in the image trail buffer 274. The Mellow flag is used in association with the durable storage of image trail context records, as is described in more detail below with reference to FIGS. 8C, 8H and 8I.

The receiver process also stores a "Next Message Sequence Number" 396, a "restart MAT position" 398, and an "ExpectStopUpdate" flag 399. The Next Message Sequence Number 396 is the message sequence number the receiver expects to see in the next message buffer receiver and is normally incremented by one after each message buffer is received. During normal operation, the restart MAT position 398 is set equal to the highest MAT value of the audit records in the last message buffer that was properly sequenced and successfully received from the extractor. Whenever the receiver process is started or restarted, however, the restart MAT position 398 is initially set to the lowest of the MAT position values stored in the image trail context records 271. The ExpectStopUpdate flag 399 is a flag set in response to a special "Expect Stop Update" message from the Monitor process just prior to a StopUpdaters audit record being moved by the extractor process into its current message buffer.

Referring to FIG. 7C, the updater status table 400 maintained by the receiver process stores the following information for each updater process: a value 402 that identifies the associated image trail, the LimitPosition location 404 currently assigned to the updater, the last MIT position 406 reported by the updater process to the receiver process, and the last image trail file position 408 reported by the updater process to the receiver process. The meaning of these fields will be explained below.

Referring to FIG. 7D, the transaction status table 144 maintained by the receiver process includes for each commit/abort record processed in the master image trail 236 a transaction ID 410, a status value 412 (i.e., commit or abort), and the MIT position of the commit/abort record. The receiver also maintains a MIT position value 414 representing the last record in the MIT processed by the receiver process for purposes of updating the transaction status table 144.

Referring to FIGS. 8A–8I, and the pseudocode in Appendix 2, the receiver process 232 works as follows.

Figure 8A:
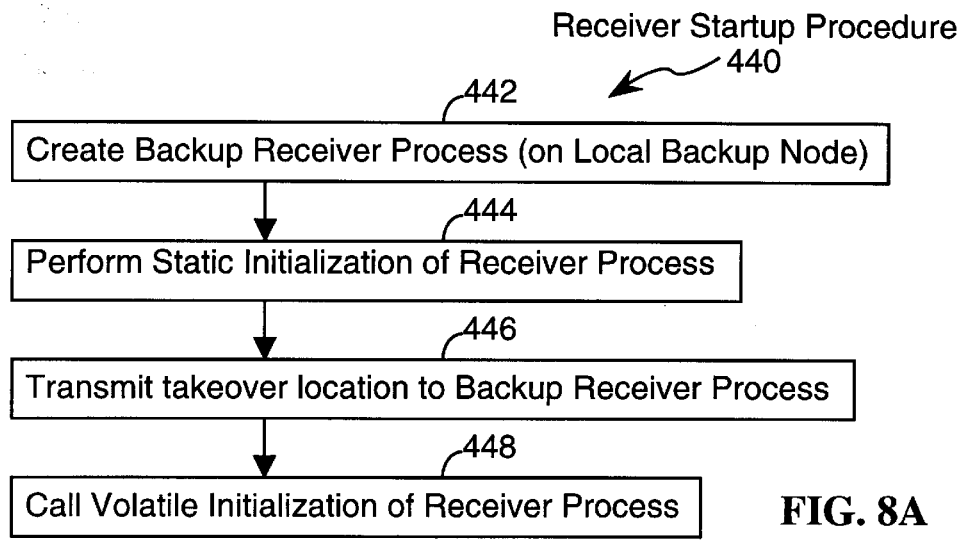
FIGS. 8A–8I flowcharts of procedures executed by the receiver process in a preferred embodiment of the present invention.

Referring to FIG. 8A, the Receiver Startup Procedure 440 is called whenever the receiver process 232 or its backup is started, as in the case of a failover or a transfer of control back to the primary receiver process 232 from the backup receiver process. The Startup procedure begins by creating a backup process (442). The startup procedure then performs a "static initialization" of the receiver process (444), which means that all static data structures used by the receiver process are allocated and initialized. Then a checkpoint operation is performed in which a takeover location is transmitted to the backup receiver process (446). The takeover location is, in essence a program address, and in the preferred embodiment the takeover location is the program location at which execution of the Receiver volatile initialization procedure 450 begins. Finally, the Receiver Startup procedure calls (448) the Receiver Volatile Initialization procedure 450.

Figure 8B:
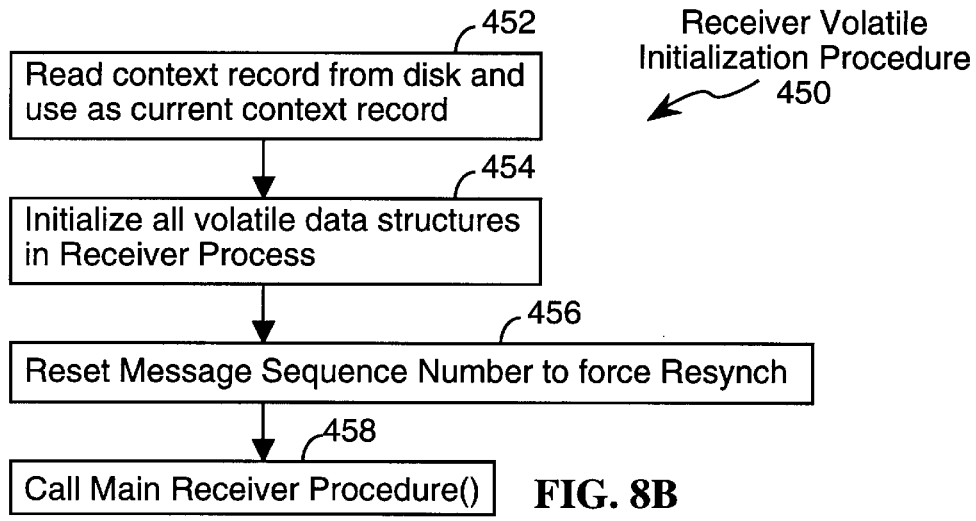
Figure 8C:
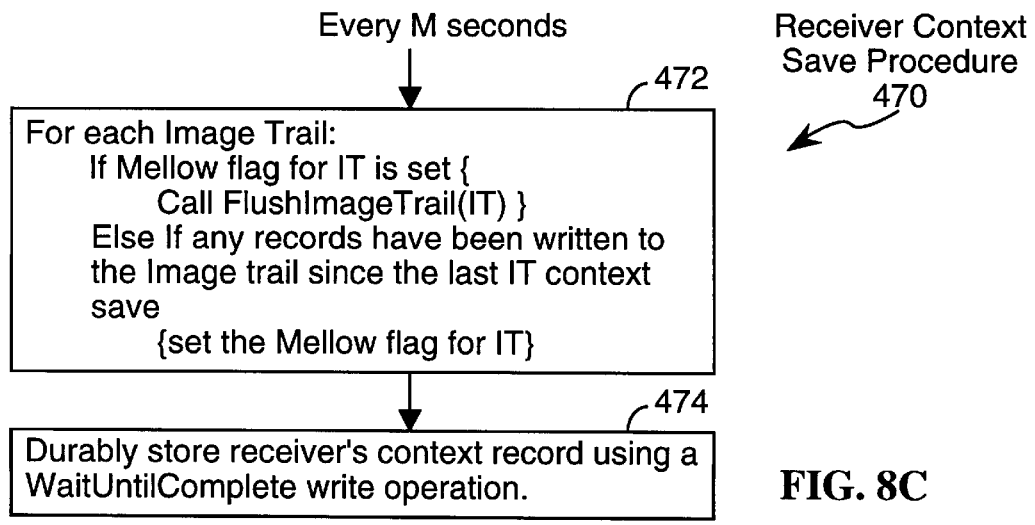

Referring to FIG. 8B, the Receiver Volatile Initialization procedure 450 is called during startup by the Receiver Startup procedure 440. The Receiver Volatile Initialization procedure 450 begins by reading the last stored Receiver context record and the last stored image trail context records from disk and using those context records as the receiver's current context records in volatile memory (452). Then the Receiver Volatile Initialization procedure allocates and initializes all volatile data structures (454) used by the Receiver process, including the image trail buffers 274, the image trail status array 392, the updater status array 400 and the transaction status table 144. Then the Receiver Volatile Initialization procedure sets the receiver's Expected Message Sequence Number to "1" (456). This will force the receiver and extractor to resynchronize, unless the extractor is starting up at the same time such as in response to a "Start RDF" command. Finally, the Volatile Initialization procedure calls (458) the Main Receiver procedure 460.

Referring to FIGS. 8C–8I, the Main Receiver procedure 460 includes a subprocedure 470 for periodically flushing image trail buffers to disk and for saving the receiver's context record. This subprocedure is called every M seconds, where M is preferably a value between 5 and 25 and is typically set to 5. The first step (472) of the context save procedure performs a "lazy" flush of image trail buffers to disk. In particular, it checks the Mellow flag for each image trail. For each image trail having a Mellow flag that is set, the FlushImageTrail procedure is called. For each image trail having a Mellow flag that is not set, but for which any records have been written since the last image trail context save for that image trail, the Mellow flag is set. The FlushImageTrail procedure is described below with reference to FIGS. 8H and 8I.

After the image trails have been flushed or marked for flushing during the next execution of the context save subprocedure, the receiver's context record is durably stored on disk using a WaitUntilComplete write operation (474) (i.e., the step does not complete until the associated disk process sends a completion message back to the receiver process).

Figure 8D:
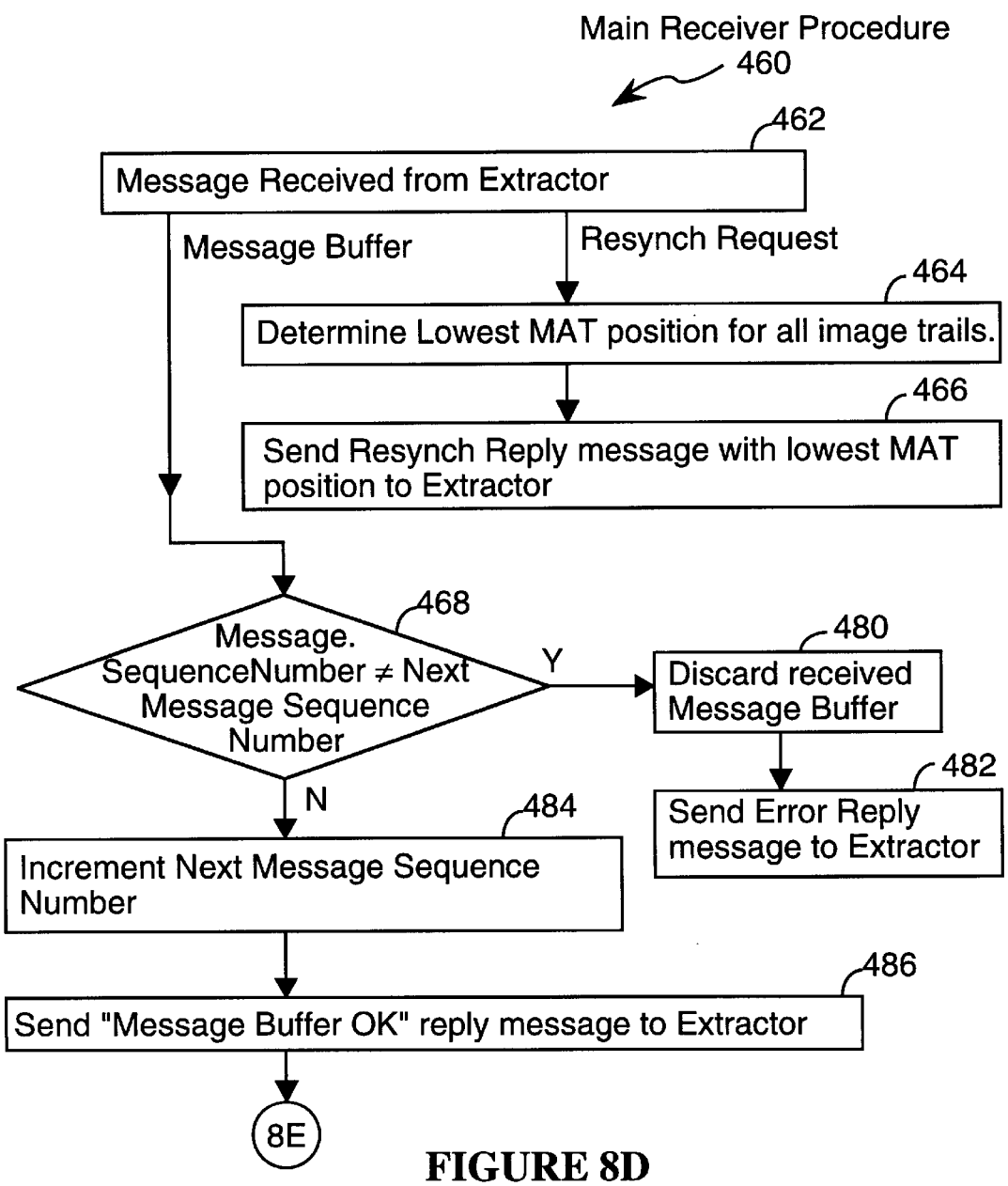
Figure 8E:
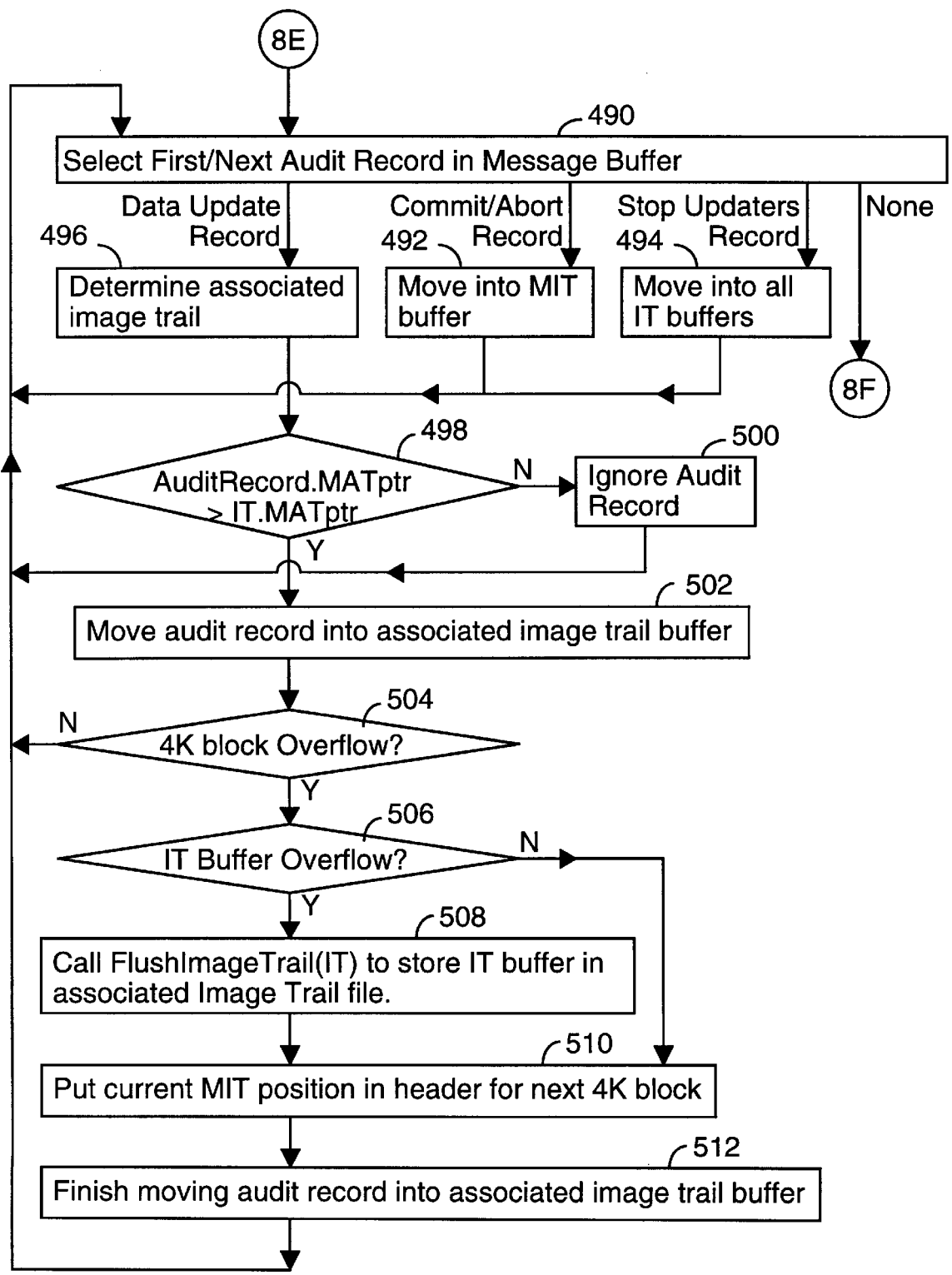
Figure 8F:
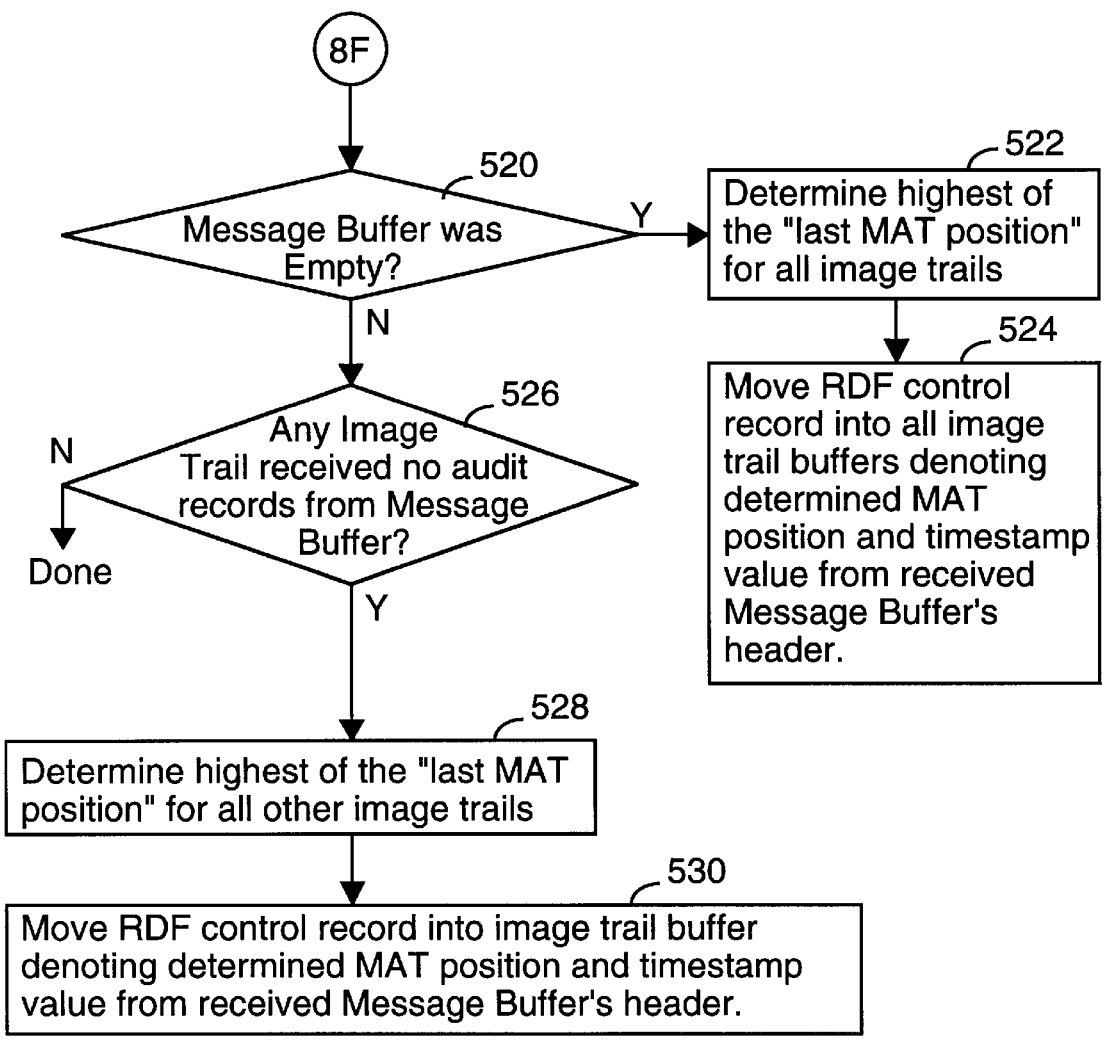
Figure 8G:
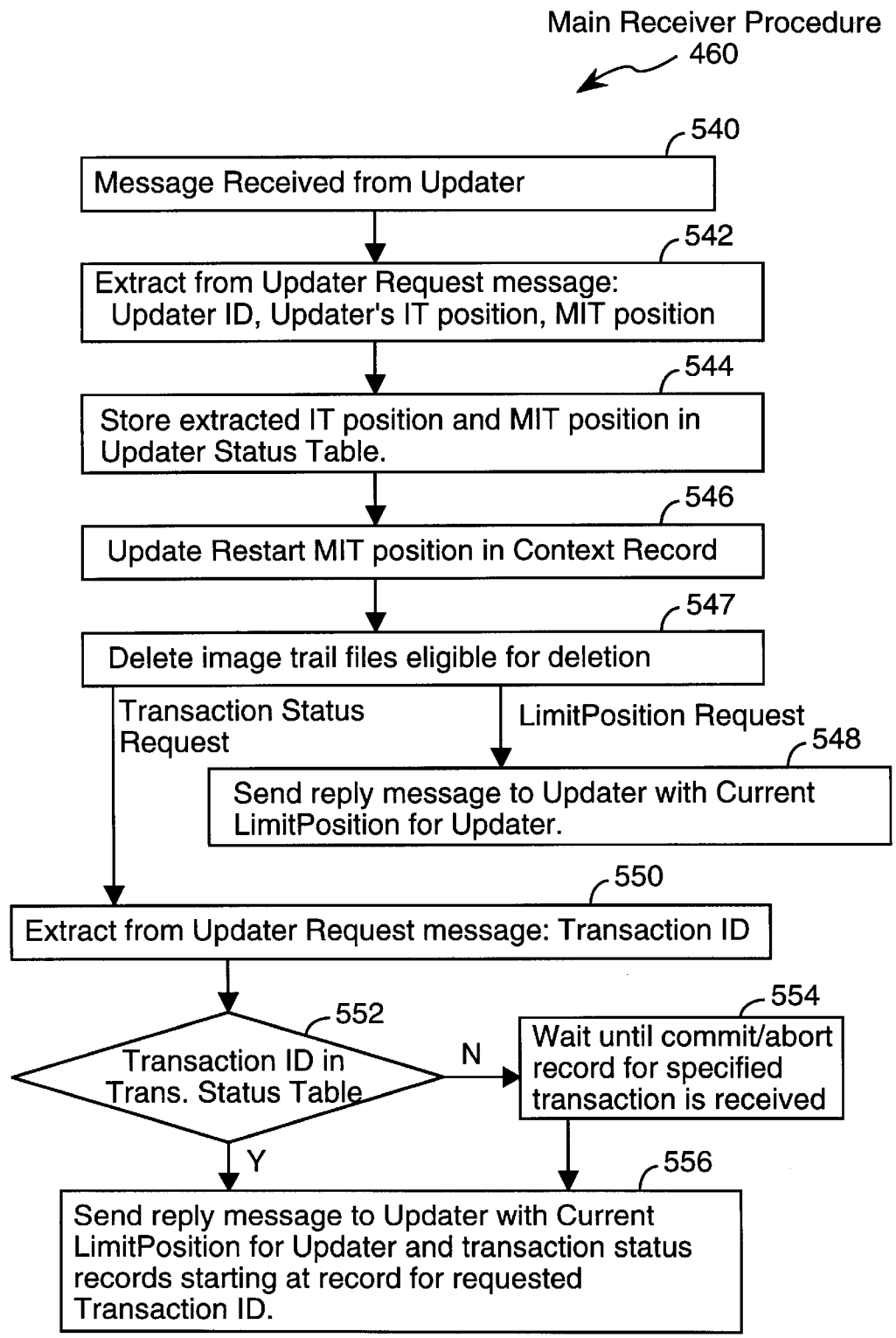
Figure 8H:
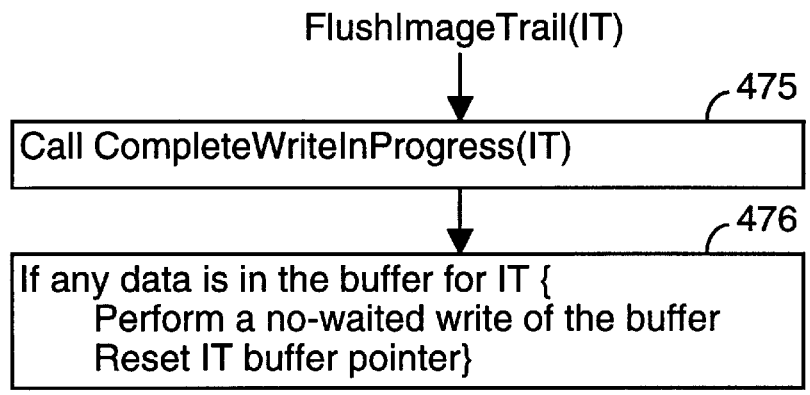

Referring to FIG. 8H, the FlushImageTrail procedure uses "no-waited writes" to write the contents of an image trail buffer to disk. When a no-waited write is initiated, the process initiating the write is not blocked. Instead it continues with execution of the program(s) it is currently executing without waiting for the write to complete. However, each time the FlushImageTrail procedure is called for a particular image trail, the first thing it does is call the CompleteWriteInProgress procedure (shown in FIG. 8I) to ensure that any previously initiated write for that image trail has completed successfully (step 475). Then the FlushImageTrail procedure preforms a no-waited write on image trail buffer for the image trail being processed, and resets the image trail buffer pointer to point to the beginning of the other buffer 274 for the image trail (step 476). Because of the operation of the CompleteWriteInProgress procedure, the other buffer 274 for the image trail is known to be available for use when step 476 is executed.

Figure 8I:
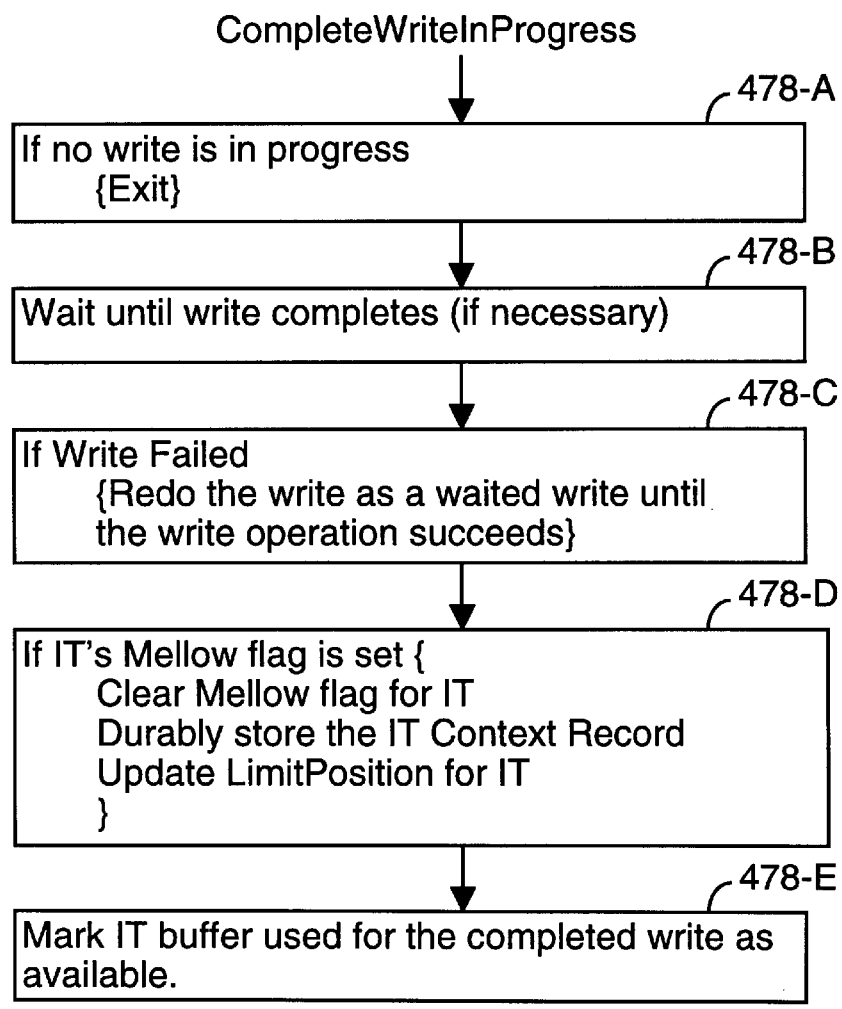

Referring to FIG. 8I, the CompleteWriteInProgress procedure immediately exits if no write for the specified image trail is in progress (step 478-A). Also, if a previously initiated write is still in progress, the procedure waits until it completes (step 478-B). Also, if a previously initiated write has failed, the write operation is repeated using a waited write operation until the write successfully completes (step 478-C). Next, if the Mellow flag of the image trail being processed is set, the Mellow flag is cleared, the Image Trail context record is durably stored and the LimitPosition for the Image Trail is updated (step 478-D). Finally, the image trail buffer associated with the write operation that has completed is marked as available so that it can be used once again by the receiver process (step 478-E).

The receiver process 232 is a "passive" process in that it does not initiate messages to other processes. Rather it only responds to messages from the extractor process 230, messages from the updater processes 234, and from the monitor process 240.

Referring to FIGS. 8D, 8E and 8F, when a message is received from the extractor process (462), if the message is a Resynch request message, the receiver determines which of the MAT positions listed in Image Trail context records is lowest (464), and sends a Resynch Reply message to the extractor with the determined lowest MAT position embedded in the reply message (466).

If the received extractor message is a message buffer message, the message sequence number (denoted Message.SequenceNumber) in the received message is compared with the locally stored Next Message Sequence Number (468). If the received message sequence number is not equal to the locally stored Next Message Sequence Number, the received message buffer is discarded (480) and an Error Reply message is sent to the extractor (482).

If the received message sequence number is in sequence, the locally stored Next Message Sequence Number is incremented by one (484) and a "Message Buffer OK" reply is sent to the extractor (484). A message buffer identifier is associated with the received message and is also associated with the reply message so that the extractor can properly update its message buffer status table by marking the acknowledged message buffer as available.

Next, all the audit records in the received message buffer are processed in sequence (490). Each commit/abort audit record is moved into the MIT buffer 274-1 (492). Furthermore, the contents of each commit/abort record are used to store a new corresponding transaction status record in the transaction status table 144. Each "Stop Updaters" record is processed as follows. The MAT position (AuditRecord.MATptr) in the StopUpdaters record is compared with the MAT position (IT.MATptr) for each identified image trail. If the MAT position of the StopUpdaters records is higher than the MAT position for all the image trails, (A) the StopUpdaters records is moved or copied into all the image trail buffers 274 record (494) and (B) the Receiver-.StopUpdatersCnt 391 count value in the receiver context record 270 is incremented.

Each data update audit record is processed as follows. First, the image trail associated with the record is determined (by determining the database object updated on the primary system, determining the volume on which that object is stored, determining the updater responsible for replicating RDF protected files on that volume and then determining the image file associated with that updater) (496). Next, the MAT position (AuditRecord.MATptr) in the audit record is compared with the MAT position (IT.MATptr) for the identified image trail. If the audit record's MATptr is not larger than the image trail's MATptr, the audit record is ignored (500) because it has already been processed by the receiver.

Otherwise, the audit record is moved into the identified image trail buffer (502). However, if doing so would overflow a 4K byte block within the image trail buffer (504) special processing is required (see description of steps 510, 512 below). Furthermore, if moving the audit record into the image trail buffer would overflow the last block in the image trail buffer (506) the entire image trail buffer through the last 4K block is durably stored in the associated image trail file (508) by calling the FlushImageTrail procedure (see FIGS. 8H and 8I).

If either a 4K byte block has been overflowed, or the entire message buffer has overflowed, the current MIT file position (which is the MIT file position associated with the last audit record written to the MIT message buffer) is stored in the header for the next 4K block in the image trail buffer (510). Then the process of moving the current audit record into the image trail buffer is completed (512) and processing of the next audit record (if any) in the received message buffer begins at step 490.

If the received message buffer was empty (520), the receiver determines the highest of the MAT positions stored in the context records for all the image trails, which is equal to the MAT position of the last audit record received from the extractor in the last message buffer received that contained any audit records. Then an "RDF control record" is moved into all the image trail buffers (524). The RDF control record denotes (A) the determined highest MAT position, and (B) the timestamp value in the received message buffer's header.

If the received message buffer was not empty (520), but if one or more image trails received no audit records from the current message buffer (526), the receiver determines the highest of the MAT position s stored in the context record for all the other image trails (528), which is equal to the MAT position of the last audit record received from the extractor in the current message buffer. Then an "RDF control record" is moved into each image trail buffer that did not receive any audit records (530). The RDF control record denotes (A) the determined highest MAT position, and (B) the timestamp value in the received message buffer's header.

Referring to FIG. 8G, when a message is received from any updater process (540), the message is initially processed by extracting from the updater request message (A) the updaters identifier, (B) the updater's current image trail position, and (C) the last MIT position read by the updater from a block header in the updater's image trail (542). The extracted image trail position and MIT position are stored in the Updater Status table (544). Using the updated information in the Updater Status table, the Restart MIT position in the receiver's context record is updated to be equal to the lowest MIT position for all the updaters (546). In addition, the receiver process deletes any image trail files eligible for deletion based on the updated image trail position values received from the updater (547).

If the received Updater request message is a LimitPosition request message, the receiver reads the current LimitPosition location for the updater and sends a reply message with that LimitPosition location to the requesting updater (548).

If the received Updater request message is a Transaction Status request message, the receiver extracts from the request message the Transaction identifier for which the updater is requesting a status value (550). Then the transaction status table 144 is inspected to see if the status of that transaction is known (552). If not, the receiver waits until a commit/abort record for the specified transaction is received from the extractor (554). Once the transaction status of the identified transaction is known, a reply message is sent to the requesting updater (556). The reply message includes (A) the current LimitPosition for the updater, and (B) a set of transaction status records, starting with the record for the identified transaction. Preferably a substantial number of transaction records (e.g., 200 records, or all the status records in the TST 144 after the identified record if less than 200) is sent with each reply so as to reduce the number of Transaction Status requests sent by updaters.

Detailed Explanation of Updater Processes

Figure 9:
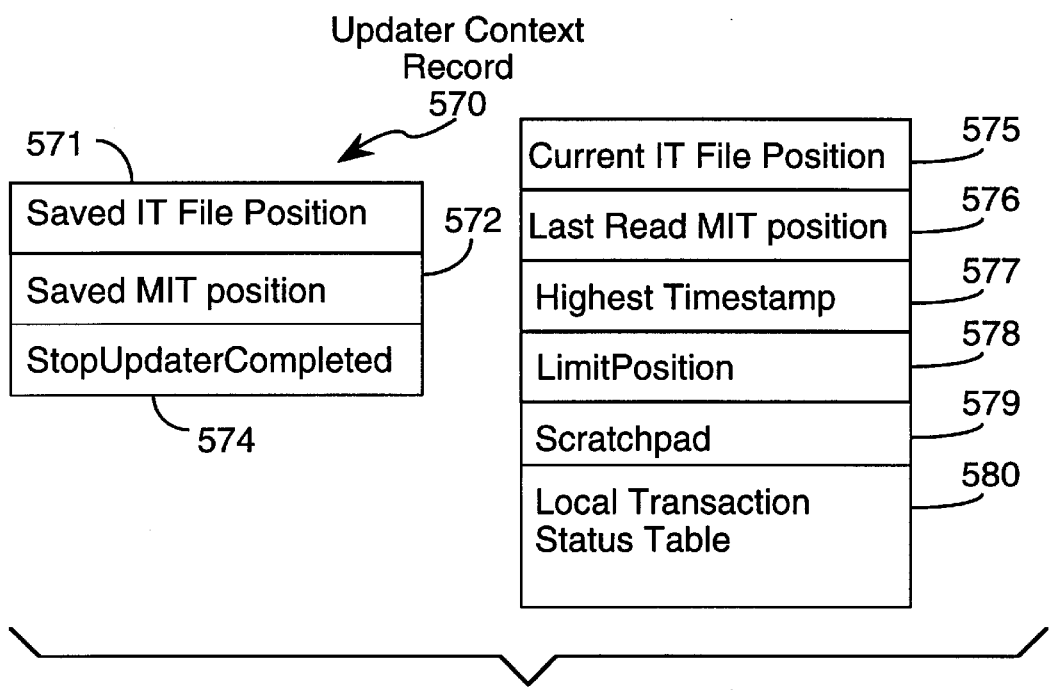
FIG. 9 is a block diagram of data structures, stored in primary memory, used by each updater process in a preferred embodiment of the present invention.

The primary data structures used by each updater process 234 in the preferred embodiment are shown in FIG. 9. Each updater process durably stores a context record 570 on a nonvolatile (disk) storage device on a periodic basis (e.g., once every 2 to 10 minutes, with 5 minutes being preferred). As shown in FIG. 9 the context record includes a saved image trail file position 571, a saved last MIT position 572, and a StopUpdaterCompleted flag 574. Each updater also stores in volatile memory

- a current image trail file position 575,
- a "Last Read MIT Position 576, which is the last MIT position read by the updater from a block header in the updater's image trail,
- a Highest Timestamp value (577), equal to the highest timestamp of any audit record processed by the updater,
- a LimitPosition image trail file position (578),
- a scratch pad (579) for processing audit records, and
- a local transaction status table (580) provided to the updater by the receiver process.

The Highest Timestamp value 577 is not used by the RDF procedures discussed here. However, it is accessible by procedures executed by the Monitor process 240 for monitoring how far the updaters are running behind the TM/MP 202, and thus how long it would take the RDF system 220 to synchronize the backup database 124 with the primary database 108 if all transactions on the primary system were to stop.

Referring to FIGS. 10A–10E, and the pseudocode in Appendix 3, the updater processes 234 work as follows.

Figure 10E:
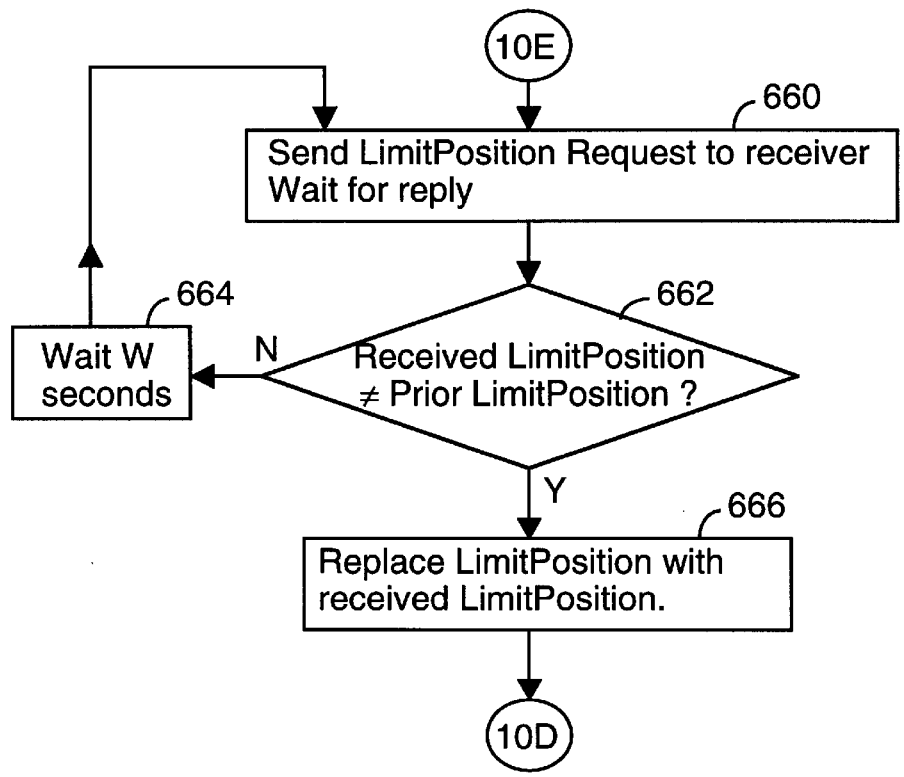
FIGS. 10A–10E are flowcharts of procedures executed by the updater processes in a preferred embodiment of the present invention.
Figure 10A:
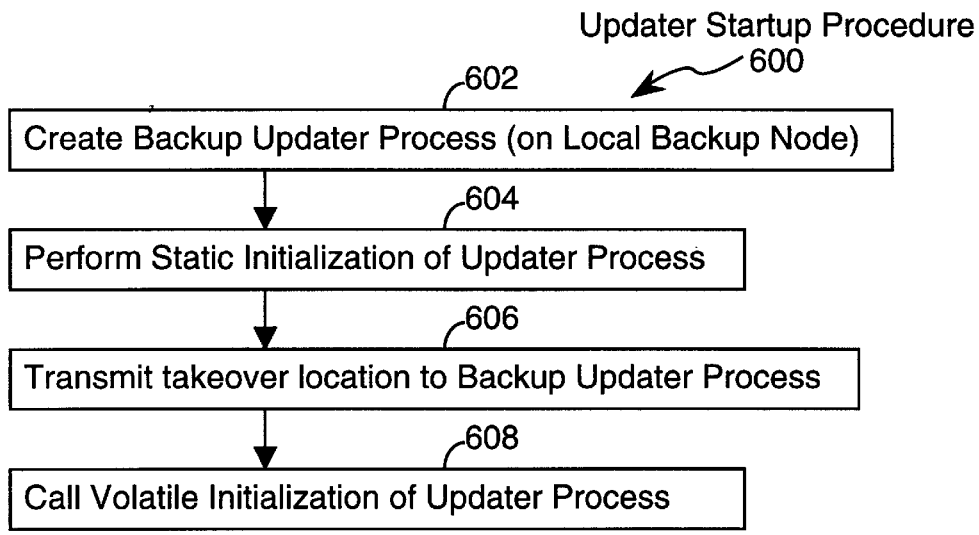

Referring to FIG. 10A, the Updater Startup Procedure 600 is called whenever any updater process 234 is started. The Updater Startup procedure begins by creating a backup process (602). The startup procedure then performs a "static initialization" of the updater process (604), which means that all static data structures (such as a map of primary volumes to backup volumes) used by the updater process are allocated and initialized. Then a checkpoint operation is performed in which a takeover location is transmitted to the backup updater process (606). The takeover location is, in essence a program address, and in the preferred embodiment the takeover location is the program location at which execution of the Updater Volatile Initialization procedure 610 begins. Finally, the Updater Startup procedure calls (608) the Updater Volatile Initialization procedure 610.

Figure 10B:
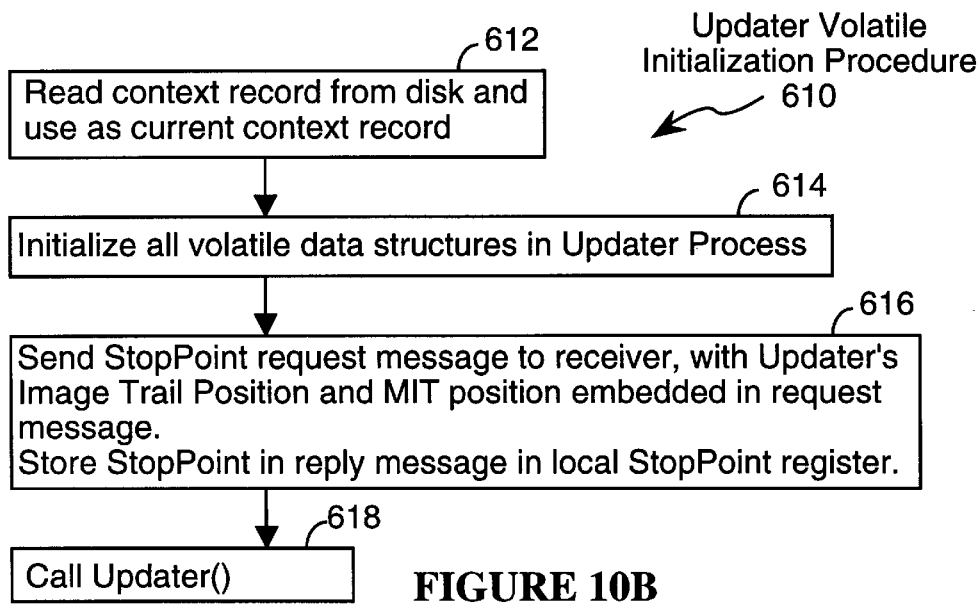

Referring to FIG. 10B, the Updater Volatile Initialization procedure 610 is called during startup by the Updater Startup procedure 600. The Updater Volatile Initialization procedure begins by reading the last stored Updater context record from disk and using it as the updater's current context record in volatile memory (612). Then the Updater Volatile Initialization procedure allocates and initializes all volatile data structures (614) used by the Updater process, including the scratchpad 579 and local transaction status table 580. Then the Updater Volatile Initialization sends a LimitPosition request message to the receiver with the updater's current image trail position and MIT position embedded in the message, and stores the LimitPosition value in the resulting reply message in its local LimitPosition register 578. Finally, the Volatile Initialization procedure calls (618) the main Updater procedure 620.

Figure 10C:
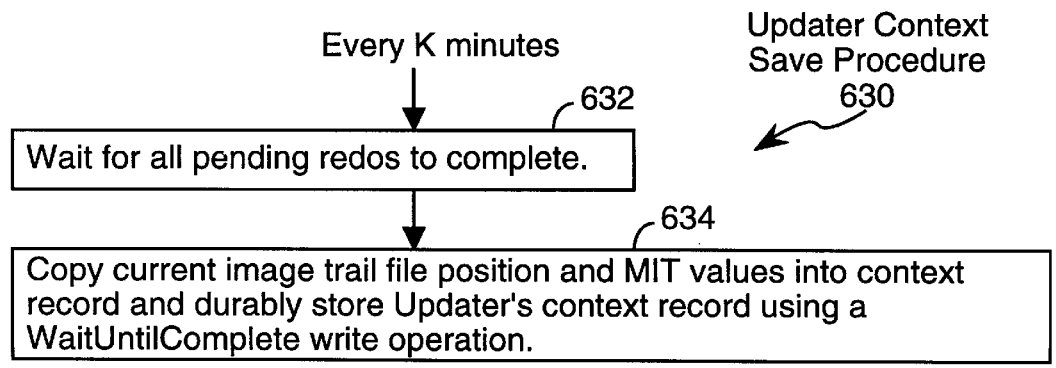
Figure 10D:
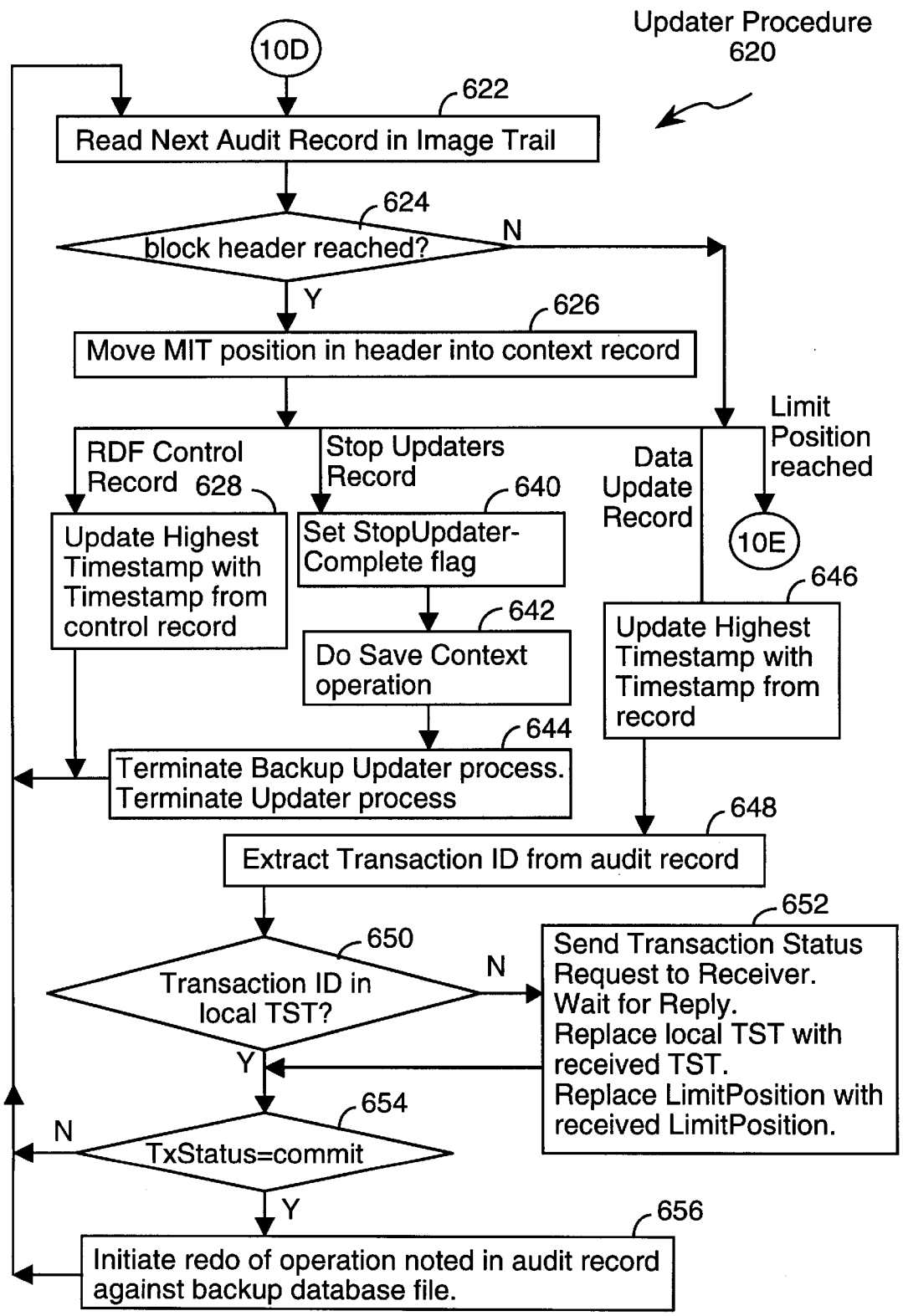

Referring to FIGS. 10C–10E, the Main Updater procedure 620 includes a subprocedure 630 for periodically saving the updater's context record. This subprocedure is called every K minutes, where K is preferably a value between 2 and 10 and is typically set to 5. The first step (632) of the updater context save procedure 630 is to wait for all currently pending redo operations to complete so that the data stored in the updater's backup disk volume is known to reflect all updates through the last audit record read by the updater. Then the updater context save procedure copies the current Image Trail File Position 575 and the current Last Read MIT Position 576 into the corresponding fields of the context record 570, and durably stores the context record 570 on disk (634).

Referring to FIGS. 10D and 10E, the primary job of the Main Updater procedure 620 is to process audit image records in its image trail. At step 622 it reads the next audit record, if any, in the image trail. If, while reading that record, a 4K byte block header is encountered (624), the MIT position denoted in that header is moved into the updater's current MIT position register 576 (626).

If the audit record just read is an "RDF Control" record, the Highest Timestamp register 577 is updated by storing in it the timestamp in the RDF control record (628). Then processing resumes with next audit record (622).

If the audit record just read is a "Stop Updaters" record, the StopUpdaterCompleted flag 574 in the Updater context record 570 is set to True (640) and the Updater context save procedure 620 is called (642). The StopUpdaterCompleted flag 574 is read by the Monitor process to ensure that all Updaters have stopped and that all have processed their image trails through the StopUpdaters record (as opposed to stopping due to a failure). Then the updater's backup process is terminated and the updater process itself terminates (644). The updater process will startup again after the operator of the RDF system performs on the remote backup system the DDL operation that created the Stop Updaters audit record and then enters either he "Start Update" or "Takeover" command.

If the audit record just read is a database object update (i.e., data update) record, the Highest Timestamp register 577 is updated by storing in it the timestamp from the audit image record (646). The transaction identifier is extracted from the audit record (648). Then the local transaction status table 580 is inspected to see if it contains a status record for the identified transaction (582). If not, a Transaction Status Request message is sent to the receiver (652). When a reply message is received, the local transaction status table 580 is replaced with the transaction status table embedded in the reply message, and the LimitPosition stored in LimitPosition register 578 is replaced with the LimitPosition value embedded in the reply message.

Once the local status transaction table contains a status record for the identified transaction, the transaction status of that transaction is determined (654). If the transaction status is "commit," a redo of the database object update operation noted in the audit record is initiated against the backup database file (656). If the transaction status is "abort," the audit record is not further processed. In either case, processing resumes with next audit record (622).

When the attempt to read a next audit record (622) encounters an audit record at or beyond the LimitPosition value in LimitPosition register 578, a LimitPosition request message is sent to the receiver (660) to determine whether the LimitPosition for the updater has been advanced. When a reply message is received, the LimitPosition value in the received message is compared with the locally stored LimitPosition value (622). If the two are equal, the updater 234 cannot process any further audit image records. As a result, the updater waits for W seconds (664), where W is preferably a value between 1 and 10 and is typically set to 5, and then sends another LimitPosition request message to the receiver (660). This continues until a new LimitPosition value is received from the receiver. At that point the locally stored LimitPosition value in LimitPosition register 578 is replaced with the LimitPosition value in the received reply message, and then processing of audit image records resumes at step 622.

Alternate Embodiments

Figure 11C:
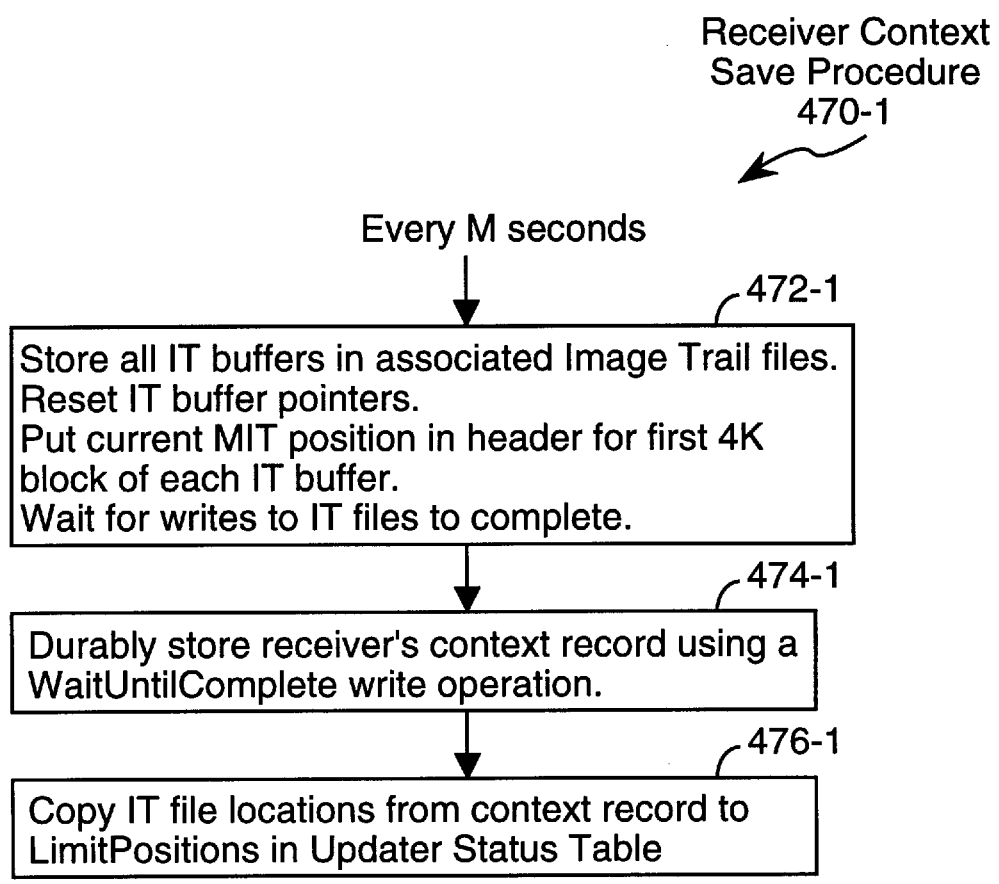

Referring to FIGS. 11A–C, in an alternate embodiment, full image buffer flushes are performed every M seconds followed by a receiver context record save. This alternate embodiment has the advantage that, in the event of a "triple system failure" consisting of a failure of the remote backup system, followed by a "permanent" (i.e., long term) failure of the primary system before the backup system resumes normal operation (the "third" failure being the overlapping failure of both systems), followed by the eventual restoration of the backup system but not the primary system, it is still guaranteed that no transaction will be only partially replicated on the backup system. When a transaction is only partially replicated, some database updates for the transaction are replicated but others are not, leaving the backup database in an inconsistent state. This alternate embodiment prevents such a failure by using a very conservative method of updating the receiver context record and LimitPositions used by the updaters. However, this alternate embodiment is less computationally efficient than the earlier described embodiment because the normal operation of the receiver process is interrupted or blocked for a longer period of time by the periodic context save operation (once every M seconds).

In the alternate embodiment, a single receiver context record 270-1 is used to represent all the information regarding the receiver process and image trails that needs to be periodically durably stored. As shown in FIG. 11A, this context record 270-1 stores two location values (a MAT position and file location) per auxiliary image trail 238, plus a restart MIT position 390 indicating what records to include when rebuilding the transaction status table, and the Receiver.StopUpdatersCnt value 391 (described above).

As shown in FIG. 11B, in this alternate embodiment, a Mellow flag is not used for each image trail, and thus the IT buffer status table 392-1 does not store a Mellow flag.

Referring to FIG. 11C, in this alternate embodiment, the Receiver Context Save Procedure 470-1 that is called every M seconds works as follows. The first step (472-1) of the receiver context save procedure durably stores the contents of each image trail buffer to its associated image trail file and resets all image trail buffer pointers (in IT buffer status table 392-1) to point to the beginning of each image trail buffer 274. The procedure also copies the current MIT end of file position from the context record into the first block header 394 in each of the image trail buffers. Then the procedure waits for the writes to the image trail files to complete (472-1).

Once the image trail buffer contents have been written to disk, the receiver's context record is durably stored on disk using a WaitUntilComplete write operation (474-1) (i.e., the step does not complete until the associated disk process sends a completion message back to the receiver process). Finally, the image trail file locations in the receiver context record are copied into the LimitPosition fields in the Updater Status table 400 (476-1). This last step allows the Updaters to process records up through the last audit image record stored on disk prior to the last context save operation.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

- 40 -

APPENDIX 1
PSEUDOCODE FOR EXTRACTOR PROCESS

```
       Procedure: Startup Extractor()
 5     Upon Startup of Extractor:
       {
       Create a backup extractor process
       Perform static initialization of Extractor process
       Transmit a takeover location to the backup extractor process
10     Call Volatile Initialization of Extractor()
       }

Procedure: Volatile Initialization of Extractor()
       {
15     Initialize all volatile data structures in Extractor process
       Send request message to Receiver process asking for safe MAT to use
       Wait for Resynch Reply Message from Receiver process
       Set MATptr to MAT value received from RDF Receiver process
       Set Extractor's Message Sequence Number to 1
20     Call Extractor()
       }

Procedure: Extractor()
       Initialize and start Msg Timer     /* times out once J every seconds (typically,
25                                           once every one or two seconds */
       /* MATptr points to the next audit record to be processed */
       Do Forever
       {
       Read next audit record, if any
30     If record is associated with an audited database table on an RDF
               protected volume, is a commit/abort record, or is a StopUpdaters
               record
               {
               Insert MATptr into audit record
35             If record is a StopUpdaters record
                       {
                       Send StopUpdaters record to Monitor Process using a waited
                           message send.
                           /* Extractor process waits for reply from Monitor */
```

- 41 -

```
            }
        Append to audit record a Timestamp from the last read commit or
            abort record
        If there sufficient room in Message Buffer to store audit record
 5          Move augmented audit record into Message Buffer
        Else
            {
            Insert Message Sequence Number in message buffer header
            Insert timestamp from the last read commit or abort record in
10              Message Buffer header
            Transmit Message Buffer to RDF Receiver
            Update message buffer status array
            Clear and restart MsgTimer
            Increment Message Sequence Number
15          Move augmented audit record into next Message Buffer when it
                becomes available  /* either buffer is already available or
                Extractor will wait until one becomes available via
                acknowledgment from Receiver */
            }
20      }
    }

In Background:
    Do Forever:
25      {
        If Msg Timer has timed out
            {
            If Message Buffer contains no audit records
                Insert current timestamp in Message Buffer header
30          Else
                Insert timestamp from the last read commit or abort record in
                    Message Buffer header
            Insert Message Sequence Number in Message Buffer header
            Transmit Message Buffer to Receiver process
35          Update message buffer status array
            Increment Message Sequence Number
            Restart Msg Timer
            }
        Whenever a reply message is received from the Receiver process
```

- 42 -

```
     {
     If message is a "Audit Message" acknowledgment
            {
            If message is a "Message Buffer OK" reply message
 5             {
               Update Message Buffer Status array to indicate that the
                     corresponding message buffer is available for use
               }
            Elseif message is an "Error / Need Resynch" reply message
10             {
               /* Need to resynchronize Extractor and Receiver Processes */
               Wait for any other pending message acknowledgment replies
                     to be received (and ignore them)
               Call Volatile Initialization of Extractor()
15             }
            }
     }   /* End of reply message processing */
     }   /* End of background Do Loop */
```

- 43 -

APPENDIX 2
PSEUDOCODE FOR RECEIVER PROCESS

```
       Procedure: Startup Receiver Process()
 5     {
       Create a Backup Receiver Process
       Perform static initialization of Receiver process
       Transmit a takeover location to the Backup Receiver process
       Call Receiver Volatile Initialization()
10     }

Procedure: Volatile Initialization of Receiver()
       {
       Recover last stored context record and use as current context record (in
15         memory)
       Initialize all volatile data structures in Receiver process, including
           transaction status table and image trail buffers
       Set Next Message Sequence Number to 1
           /* Setting SeqNo to 1 forces resynchronization */
20     Call Receiver()
       }

Procedure: Receiver()
       {
25     /*   Save Receiver Context Subprocedure */
       Every M seconds /* M is typically between 5 and 25, with 15 being preferred
       */
           {
           For each IT
30             {
               If MellowFlag(IT) is set
                   { Call FlushImageTrail(IT) }    /* see Figs. 8H and 8I */
               Else If (any records have been written to the image trail since the last
                   image trail context save for this image trail buffers in associated
35             Image Trail files)
                   { set MellowFlag(IT) )
               }
           Durably store Receiver's Context record using a WaitUntilComplete write
               operation
```

- 44 -

```
            }

When an Extractor Resynch request message is received
                {
 5              Determine lowest MAT position for all the image trails
                Send Resynch Reply Message with lowest MAT position to Extractor
                }

Upon Receiving a Message Buffer
10              {
                If Message.SequenceNumber ≠ Next Message Sequence Number
                        {
                        Discard received message buffer
                        Send "Error / Need Resynch" Reply Message to Extractor
15                      }
                Else
                        {
                        Increment Next Message Sequence Number
                        Send "Acknowledgment" Reply Message to Extractor process
20                      For each data update record
                                {
                                Determine associated Image Trail
                                If MAT value in data update record is greater than the MAT value
                                    for the last audit record moved into the associated Image
25                                  Trail Buffer
                                    {
                                    Move data update record into the associated Image Trail
                                        buffer
                                    }
30                              Else
                                }
                                Ignore data update record    /* it was already written to the
                                                                image trail */
                                }
35              }
                Move all commit/abort records to buffer for Master Image Trail
                Copy each "RDF Stop Updaters" record into buffers for all image
                    trails
```

- 45 -

```
         When any 4K block in the image trail buffer is full
             Put current MIT position in header for the next 4K block When any image trail buffer is too full to accept a record or new block
5            header
             {
             Using an Unwaited Write, durably store the data in the buffer in
                 the associated image trail file
             Reset Pointers to beginning of buffer
10           Resume updating block headers and moving audit record(s) into
                 the image trail buffer
             }

Whenever a received message buffer is empty
15           {
             Determine highest MAT of the "last MAT positions" for all the
                 Image Trails
             Write an RDF control record into all Image Trail buffers denoting
                 the determined MAT position and the timestamp value in the
20               message buffer's header
             }

When received message buffer is not empty and any Image Trail (an
             inactive Image Trail) receives no data update records from the
25           last received Message Buffer
             {
             Determine highest MAT of the "last MAT positions" for the other
                 Image Trails
             Move an RDF control record into the inactive Image Trail's buffer
30               denoting the determined MAT position and the timestamp
                 from the Message Buffer header
             }

}
35   } /* End of processing for a received message buffer of audit image
     records In Background:
         {
```

- 46 -

```
                Read all commit/abort records written to Master Image Trail and update
                    Transaction Status Table accordingly
                }

5       When any request is received from an Updater
                {
                Extract from Updater message the identity of the sending Updater, the
                    Updater's current Image Trail position and MIT position
                Store Image Trail Position and MIT position in Receiver's Updater Status
   10               Table
                Update Restart MIT position in Context Record (in memory)
                Delete any image trail files eligible for deletion based on updated image
                    trail position values.

15           When request is a LimitPosition request
                /* LimitPosition Request message is sent by an Updater when it restarts,
                    reaches its LimitPosition, or reaches end of its image trail */
                    {
                    Send reply message to Updater specifying its current LimitPosition
   20                   location
                    }

When the request is a Transaction Status request
                    {
   25               Extract Transaction ID from Request
                    Attempt to locate the status record in the transaction status table
                        (TST) for that Transaction ID
                    If record is not found
                        {
   30                   Wait until commit/abort record is received from Extractor for the
                            specified transaction
                        Update transaction status table with receiver commit/abort
                            information
                        }
   35               Send Reply Message to requesting Updater with LimitPosition for
                        Updater and N status records, starting at the located record
                        (Send all status records to end of status table if number of
                        records in table after the located record is less than N)
                        /* N is typically 200 or larger */
```

- 47 -

```
        }
    }   /* end of processing of Updater Request */
}   /* end of Receiver procedure */
```

- 48 -

APPENDIX 3
PSEUDOCODE FOR EACH UPDATER PROCESS

```
      Procedure: Startup Updater()
 5       /* startup caused by either "Start RDF" or "Start Update" commands */
         {
         Create a Backup Updater Process
         Perform static initialization of Updater process
         Transmit a takeover location to the Backup Updater process
10       Call Volatile Initialization of Updater()
         }

Procedure: Volatile Initialization of Updater()
         {
15       Read last stored context record and use as current context record (in
                memory) /* includes current image trail position and MIT position */
         Initialize all volatile data structures in Updater process, including file and
                buffer structures 20       Send LimitPosition Request Message to Receiver process, including
                Updater's current Image Trail position and MIT position in the
                message
         Wait for reply
         Extract LimitPosition from Reply Message
25       Call Updater()
         }

Procedure: Updater()
      Do Forever
30       {
         /*   Save Updater Context Subprocedure */
         Every K minutes    /* K is typically between 2 and 10, with 5 being
                                preferred */
            {
35          Wait for all pending redos to complete
            Durably store Context record using a WaitUntilComplete write
      operation
            }
```

- 49 -

```
       Read next record in Image Trail, but do not go beyond the last
           LimitPosition specified by the Receiver process
       If at LimitPosition
           {
 5         Do Until current Image Trail position ≠ LimitPosition
               {
               Once every W seconds, Send a LimitPosition Request message
                   to the Receiver  /* W is typically a value between 1 and 10 */
               Wait for Reply
10             Extract LimitPosition from reply message
               }
           }
       If block header was encountered
           Get MIT position from block header and store MIT position in
15             Updater's context record
       BEGIN CASE (audit record type)
           {
           Case: record type = RDF Stop Updaters record
               {
20             Perform normal context save operation, including durably storing
                   context record
               Terminate backup Updater Process
               Terminate Updater Process
               }
25         Case: record = RDF control record
               {
               Update local HighestTimestamp with timestamp from record
               }
           Case: record = data update record
30             {
               Update local HighestTimestamp with timestamp from record
               Determine transaction ID of update
               Check local transaction status table for status of identified
                   transaction
35             If transaction ID is not found
                   {
                   Send a Transaction Status Request to the Receiver process,
                       denoting the transaction ID not found in the local status
                       table.  Include in the request message the current MIT
```

- 50 -

```
                    position in the Updater's context record and the position
                        of the current record in the Image Trail file
                    Wait until Receiver sends Reply Message with status data
                    Replace local status table with status data received from
5                       Receiver (typically includes status records for 200 or
                        more transactions)
                    }
                TxStatus = commit/abort status indicated in status table for
                    identified transaction
10              If TxStatus=commit
                    {
                    Initiate a redo of the operation noted in the audit record
                        against the backup database file.  (The redo operation is
                        performed by disk process for the volume on which the
15                      file is located on the remote backup system.)
                    }
                } /* processing of data update record ends here */
            } /* End of Case Statement */
        } /* End of Do Loop */
```

What is claimed is:

1. A method for operating a distributed computer system including a local computer system having a local database, the local computer system in communication with a remote computer system having a backup database at least partially replicating the local database, the method comprising the steps of:

receiving a plurality of message buffers from the local computer system, each message buffer having an associated sequence number, at least some of the message buffers including one or more audit records, wherein sequentially transmitted message buffers have associated sequence numbers that follow a predefined sequence, and each audit record has an associated audit trail position;

storing an expected sequence number based on the associated sequence numbers of the received message buffers and storing a restart audit trail position based on the audit trail positions associated with the audit records in the received message buffers;

distributing the received audit records to a plurality of image trail buffers, wherein each image trail buffer has an associated image trail file, the image trail buffers including at least one master image trail buffer and one or more auxiliary image trail buffers, the master image trail buffer having an associated master image trail file, each auxiliary image trail buffer having an associated auxiliary image trail file;

periodically storing a marked subset of the audit records of each auxiliary image trail buffer in the associated auxiliary image trail file, and durably storing an associated storage location for each auxiliary image trail file in a receiver context record, the receiver context record being used to resume execution of the method when a predefined condition occurs, and marking a next subset of the audit records of each auxiliary image trail buffer to be durably stored;

sending a reply message to the local computer system for each transmitted message buffer whose associated message sequence number matches the expected sequence number, the reply message enabling reuse of the message buffer;

transmitting an error message to the local computer system indicating a need to resynchronize the transmissions at the restart audit trail position for each transmitted message buffer whose associated message sequence number does not match the expected sequence number; and reading the audit records in the image trail files and initiating redo operations of database modifications denoted in at least a subset of the read audit records.

2. The method of claim 1 wherein a mellow flag is associated with each image trail buffer to indicate whether an image trail buffer has audit records that have not been durably stored in the associated image trail file, further comprising the step of marking an image trail buffer by setting the associated mellow flag if the associated mellow flag is not set and any audit records in the image trail buffer have not been durably stored to the associated image trail file.

3. The method of claim 2 further comprising the steps of:
determining whether any audit records in any of the image trail buffers are being durably stored;
in response to the step of determining, waiting until the audit records are durably stored; and
clearing the mellow flag associated with the image trail buffer whose audit records were durably stored.

4. The method of claim 1 wherein each image trail buffer is a double-buffer having a pair of image trail sub-buffers wherein one image trail sub-buffer is marked as available for receiving audit records.

5. The method of claim 4 wherein the sub-buffers are alternately used to receive the audit records.

6. The method of claim 1 wherein each auxiliary image trail file stores a subset of the audit records denoting modifications to contents of the local database, the master image trail file having a second subset of the audit records, the second subset of the audit records including at least some audit records that each denote a commit/abort status of a respective transaction associated with audit records in the auxiliary image trail files.

7. A distributed data processing system, comprising:

a local computer system having a local database stored on local memory media, application programs that modify the local database, and a transaction manager that stores audit records in a local audit trail;

a remote computer system, remotely located from the local computer system, the remote computer system having a backup database stored on memory media associated with the remote computer system;

a communication channel for sending messages between the local computer system and the remote computer system; and a remote data duplication facility, partially located in the local computer system and partially located in the remote computer, for maintaining virtual synchronization of the backup database with the local database, including:

an extractor process executed by the local computer system that extracts audit records from the local audit trail and transmits the extracted audit records to the remote computer system, the extractor process including a plurality of message buffers and buffering groups of the extracted audit records together in the message buffers and transmitting the message buffers to the remote computer system, each transmitted message buffer having an associated sequence number, wherein sequentially transmitted message buffers have associated sequence numbers that follow a predefined sequence, the extractor process continuing, after transmitting a first one of the message buffers to the remote computer system, to buffer groups of the extracted audit records in other ones of the message buffers and for transmitting the other message buffers to the remote computer system;

a receiver process executed by the remote computer system that stores an expected message sequence number based on the associated sequence numbers of the received message buffers and stores a context record denoting a restart audit trail position, receives message buffers from the local computer system, each message buffer including at least one audit record and having an associated sequence number, wherein sequentially transmitted message buffers have associated sequence numbers that follow a predefined sequence, and each audit record has an associated audit trail position;

responds to each received message buffer whose associated message sequence number does not match the expected message sequence number by transmitting an error message to the extractor process indicating a need to resynchronize the transmissions at the restart audit trail position;

responds to each received message buffer whose associated message sequence number matches the expected message sequence number by sending a reply message to the extractor process to acknowledge receipt of the message buffer, updating the expected message sequence number in accordance with the predefined sequence, distributing the received audit records to a plurality of image trail buffers, wherein each image trail buffer has an associated image trail file, the image trail buffers including at least one master image trail buffer and one or more auxiliary image trail buffers, the master image trail buffer having an associated master image trail file, each auxiliary image trail buffer having an associated auxiliary image trail file;

periodically stores a marked subset of the audit records of each image trail buffer in the associated image trail file, and durably storing an associated storage location for each image trail file in a receiver context record, the receiver context record being used to resume execution of the method when a predefined condition occurs, and marking a next subset of the audit records of each image trail buffer to be durably stored; and updates the restart audit trail position based on the audit trail positions associated with the audit records in the received message buffer; and one or more updater processes executed by the remote computer system, wherein each updater process reads the audit records in an assigned one of the image trail files and initiates redo operations of database modifications denoted in at least a subset of the read audit records against the backup database; and the extractor process responding to the reply message acknowledging receipt of one of the message buffers by the receiver process by enabling reuse of the one message buffer, and responding to the error message transmitted by the receiver process by determining the restart audit trail position stored by the receiver process and then extracting audit records from the local audit trail starting at the restart audit trail position.

8. The distributed data processing system of claim 7, wherein the receiver process maintains for each image trail buffer an associated mellow flag for marking the associated image trail buffer to indicate that the associated image trail buffer has audit records that have not been durably stored in the associated image trail file, and if the mellow flag is not set, the receiver process sets the mellow flag if any audit records in the image trail buffers have not been durably stored to the associated image trail file.

9. The distributed data processing database system of claim 8, wherein the receiver process:

determines if any of the audit records in any of the image trail buffers are being durably stored;

in response to the step of determining, waits until the audit records are durably stored; and clears the mellow flag associated with the image trail buffer whose audit records were stored.

10. The distributed data processing database system of claim 7, wherein each image trail buffer is a double-buffer having a pair of image trail sub-buffers wherein the receiver process includes instructions for marking one image trail sub-buffer as available for receiving audit records.

11. The distributed data processing database system of claim 10, wherein the receiver process includes instructions for alternately using the sub-buffers to receive the audit records.

12. The distributed data processing system of claim 7, wherein each auxiliary image trail file stores a subset of the audit records denoting modifications to contents of the local database, the master image trail file has a second subset of the audit records, the second subset of the audit records includes at least some audit records that each denote a commit/abort status of a respective transaction associated with audit records in the auxiliary image trail files.

13. A remote computer system, for use in conjunction with a local computer system having a local database stored on local memory media, the remote computer system comprising:

a backup database stored on memory media associated with the remote computer system;

a receiver process that includes instructions for:

receiving a plurality of message buffers from the local computer system, each message buffer having an associated sequence number, at least some of the message buffers including one or more audit records, wherein sequentially transmitted message buffers have associated sequence numbers that follow a predefined sequence, and each audit record has an associated audit trail position;

storing an expected sequence number based on the associated sequence numbers of the received message buffers and storing a restart audit trail position based on the audit trail positions associated with the audit records in the received message buffers;

responding to each received message buffer whose associated message sequence number does not match the expected message sequence number by transmitting an error message to the extractor process indicating a need to resynchronize the transmissions at the restart audit trail position;

responding to each received message buffer whose associated message sequence number matches the expected message sequence number by:

sending a reply message to the local computer to acknowledge receipt of the message buffer;

updating the expected message sequence number in accordance with the predefined sequence; and distributing audit records in the received message buffer to a plurality of image trail buffers, wherein each image trail buffer has an associated image trail file, the image trail buffers including at least one master image trail buffer and one or more auxiliary image trail buffers, the master image trail buffer having an associated master image trail file, each auxiliary image trail buffer having an associated auxiliary image trail file;

updating the restart audit trail position based on the audit trail positions associated with the audit records in the received message buffer; and periodically storing a marked subset of the audit records of each image trail buffer in the associated image trail file, and durably storing an associated storage location for each image trail file in a receiver context record, the receiver context record being used to resume execution of the method when a predefined condition occurs, and marking a next subset of the audit records of each image trail buffer to be durably stored; and one or more updater processes executed by the remote computer system, wherein each updater process reads the audit records in an assigned one of the image trail files and initiates redo operations of database modifications denoted in at least a subset of the read audit records against the backup database.

14. The remote computer system of claim 13, wherein
the receiver process maintains for each image trail buffer an associated mellow flag for marking the associated image trail buffer to indicate that the associated image trail buffer has audit records that have not been durably stored in the associated image trail file, and if the mellow flag is not set, the receiver process sets the mellow flag if any audit records in the image trail buffers have not been durably stored to the associated image trail file.

15. The remote computer system of claim 14, wherein the receiver process:

determines if any of the audit records in any of the image trail buffers are being durably stored;

in response to the step of determining, waits until the audit records are durably stored; and clears the mellow flag associated with the image trail buffer whose audit records were stored.

16. A computer program product for a remote computer system that operates in conjunction with a local computer system having a local database stored on local memory media, the local data processing system in communication with the remote data processing system, the remote computer system having a backup database stored on memory media associated with the remote computer system, the computer program product comprising a computer readable storage medium and a computer program mechanism embedded therein, the computer program product comprising:

a receiver module that includes instructions for:

receiving a plurality of message buffers from the local computer system, each message buffer having an associated sequence number, at least some of the message buffers including one or more audit records, wherein sequentially transmitted message buffers have associated sequence numbers that follow a predefined sequence, and each audit record has an associated audit trail position;

storing an expected sequence number based on the associated sequence numbers of the received message buffers and storing a restart audit trail position based on the audit trail positions associated with the audit records in the received message buffers;

responding to each received message buffer whose associated message sequence number does not match the expected message sequence number by transmitting an error message to the local computer system indicating a need to resynchronize transmission of audit records at the restart audit trail position;

responding to each received message buffer whose associated message sequence number matches the expected message sequence number by:

sending a reply message to the local computer to acknowledge receipt of the message buffer;

updating the expected message sequence number in accordance with the predefined sequence; and distributing audit records in the received message buffer to a plurality of image trail buffers, wherein each image trail buffer has an associated image trail file, the image trail buffers including at least one master image trail buffer and one or more auxiliary image trail buffers, the master image trail buffer having an associated master image trail file, each auxiliary image trail buffer having an associated auxiliary image trail file;

updating the restart audit trail position based on the audit trail positions associated with the audit records in the received message buffer; and periodically durably storing a marked subset of the audit records of each image trail buffer in the associated image trail file, and durably storing an associated storage location for each image trail file in a receiver context record, the receiver context record being used to resume execution of the method when a predefined condition occurs, and marking a next subset of the audit records of each image trail buffer to be durably stored; and an updater module, one or more instances of which may be installed on the remote computer system, wherein the updater module includes instructions for reading the audit records in an assigned one of the image trail files and initiating redo operations of database modifications denoted in at least a subset of the read audit records against the backup database.

17. The computer program product of claim 16 wherein the receiver module includes instructions for:

establishing a mellow flag associated with each image trail buffer for marking the associated image trail buffer to indicate that the associated image trail buffer has audit records that have not been durably stored in the associated image trail file, and marking an image trail buffer by setting the associated mellow flag if the associated mellow flag is not set and any audit records in the image trail buffer have not been durably stored to the associated image trail file.

18. The computer program product of claim 17 wherein the receiver module further includes instructions for:

determining if audit records in any of the image trail buffers are being durably stored;

in response to the step of determining, waiting until the audit records are durably stored; and clearing the mellow flag associated with the image trail buffer whose audit records were stored.

19. The computer program product of claim 16 wherein each image trail buffer is a double-buffer having a pair of image trail sub-buffers wherein the receiver module includes instructions for marking one image trail sub-buffer as available for receiving audit records.

20. The computer program product of claim 19 wherein the receiver module includes instructions for alternately using the sub-buffers to receive the audit records.

21. The computer program product of claim 16 wherein each auxiliary image trail file stores a subset of the audit records denoting modifications to contents of the local database, the master image trail file stores a second subset of the audit records, the second subset of the audit records including at least some audit records that each denote a commit/abort status of a respective transaction associated with audit records in the auxiliary image trail files.

* * * * *